US012686236B2

(12) United States Patent
Liukkula et al.

(10) Patent No.: US 12,686,236 B2
(45) Date of Patent: Jul. 21, 2026

(54) STUDDED TYRE HAVING GROOVES

(71) Applicant: Nokian Renkaat Oyj, Nokia (FI)

(72) Inventors: Mikko Liukkula, Nokia (FI); Aappo Laitila, Nokia (FI); Lauri Heikkinen, Nokia (FI)

(73) Assignee: NOKIAN RENKAAT OYJ, Nokia (FI)

( * ) Notice: Subject to any disclaimer, the term of this patent is extended or adjusted under 35 U.S.C. 154(b) by 0 days.

(21) Appl. No.: 18/657,609

(22) Filed: May 7, 2024

(65) Prior Publication Data

US 2024/0375454 A1     Nov. 14, 2024

(30) Foreign Application Priority Data

May 8, 2023    (EP) .................................... 23172083

(51) Int. Cl.
| | |
|---|---|
| *B60C 11/16* | (2006.01) |
| *B60C 11/00* | (2006.01) |
| *B60C 11/03* | (2006.01) |
| *B60C 11/12* | (2006.01) |

(52) U.S. Cl.
CPC ........ *B60C 11/1625* (2013.01); *B60C 11/005* (2013.01); *B60C 11/0302* (2013.01); *B60C 11/033* (2013.01); *B60C 11/1236* (2013.01); *B60C 11/1618* (2013.01); *B60C 11/1668* (2013.01); *B60C 11/1675* (2013.01); *B60C 2011/0025* (2013.01); *B60C 2011/1213* (2013.01); *B60C 2011/1254* (2013.01); *B60C 2011/1295* (2013.01)

(58) Field of Classification Search
CPC ... B60C 11/005; B60C 11/16; B60C 11/1675; B60C 2011/0025; B60C 1/0016; B60C 11/0041; B60C 11/1618
See application file for complete search history.

(56) References Cited

U.S. PATENT DOCUMENTS

| | | | |
|---|---|---|---|
| 2008/0202658 A1* | 8/2008 | Ikeda .................... | B60C 11/033 |
| | | | 152/209.27 |
| 2013/0118662 A1* | 5/2013 | Kameda .............. | B60C 11/0318 |
| | | | 152/209.8 |
| 2017/0368889 A1* | 12/2017 | Ajoviita .............. | B60C 11/1625 |

FOREIGN PATENT DOCUMENTS

| | | | | |
|---|---|---|---|---|
| CN | 112498015 A | 3/2021 | | |
| DE | 102013113043 A1 * | 5/2015 | .............. | B22F 3/225 |
| EP | 3724009 B1 | 9/2021 | | |
| EP | 4052927 A1 * | 9/2022 | .............. | B60C 1/00 |
| ES | 2216762 T3 | 11/2004 | | |

(Continued)

OTHER PUBLICATIONS

English machine translation of JP-2021030765-A (Year: 2021).*

(Continued)

*Primary Examiner* — Robert C Dye
(74) *Attorney, Agent, or Firm* — Merchant & Gould P.C.

(57) ABSTRACT

A tyre includes a tread having tread blocks such that grooves are arranged between the tread blocks and studs installed into at least some of the tread blocks. A central region of the tread is arranged between a first shoulder region of the tread and a second shoulder region of the tread. A land ratio of the central region of the tread of the tyre is 1 to 30 percentage points greater than either or both of a land ratio of the first shoulder region of the tread of the tyre and a land ratio of the second shoulder region of the tread of the tyre.

12 Claims, 10 Drawing Sheets

(56)                    References Cited

FOREIGN PATENT DOCUMENTS

| FR | 2471294 | A1 | * | 6/1981 | | |
| JP | 62094402 | A | * | 4/1987 | | |
| JP | 2021030765 | A | * | 3/2021 | | |
| RU | 2657626 | C1 | | 6/2018 | | |
| RU | 2748476 | C2 | | 5/2021 | | |
| SE | 524433 | C2 | * | 8/2004 | ............ | B29D 30/66 |
| WO | 2021/085004 | A1 | | 5/2021 | | |

OTHER PUBLICATIONS

English machine translation of JP-62094402-A (Year: 1987).*
English machine translation of FR-2471294-A1. (Year: 1981).*
English machine translation of DE102013113043A1 (Year: 2015).*
English machine translation of SE524433C2 (Year: 2004).*
Search Report issued in European Patent Application No. 23172083.0
(Oct. 19, 2023).

* cited by examiner

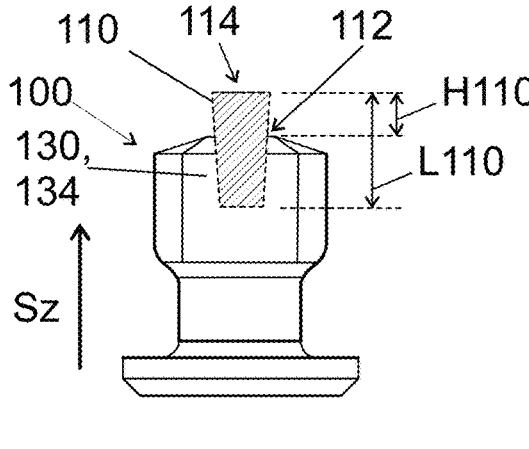
Fig. 1g
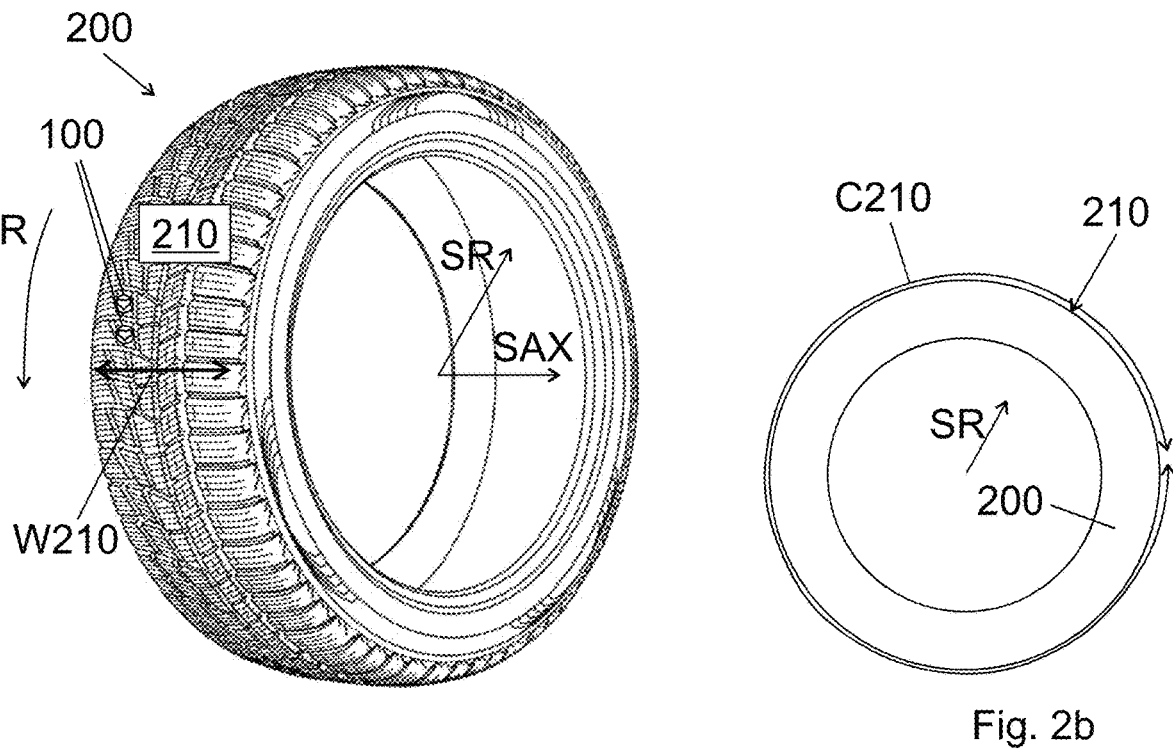
Fig. 2a
Fig. 2b

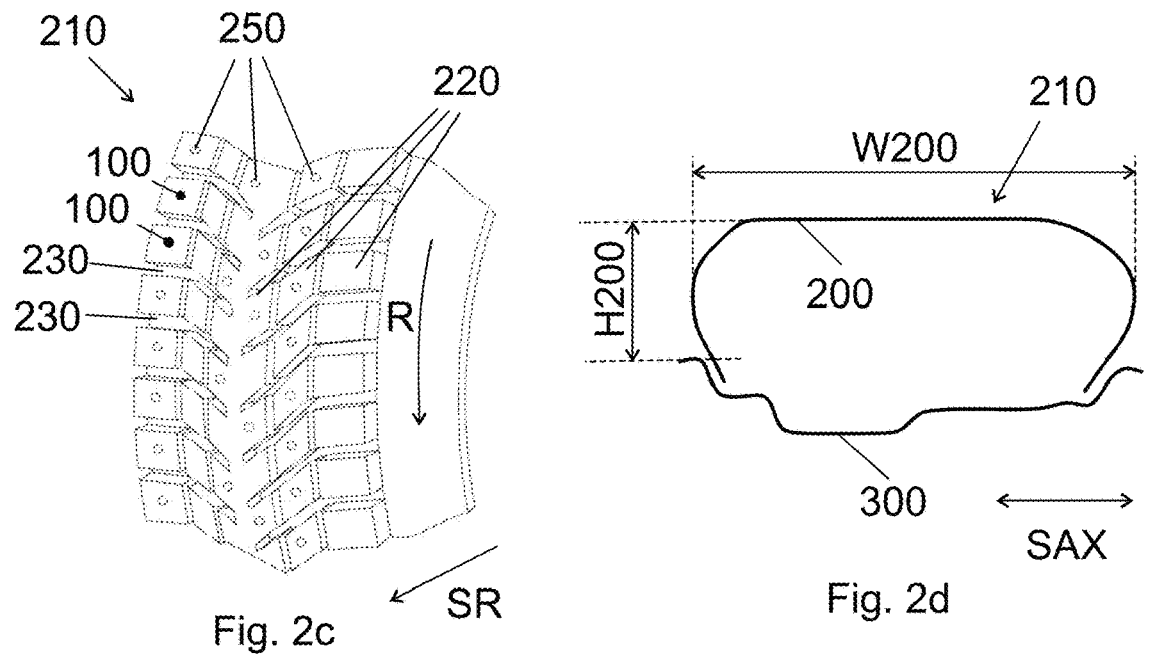
Fig. 2c
Fig. 2d
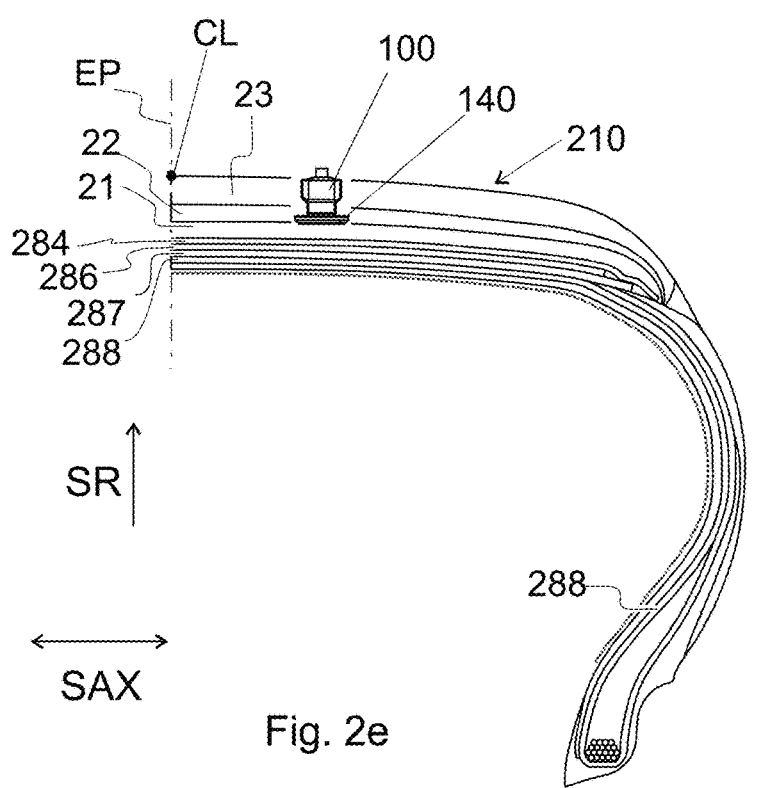
Fig. 2e

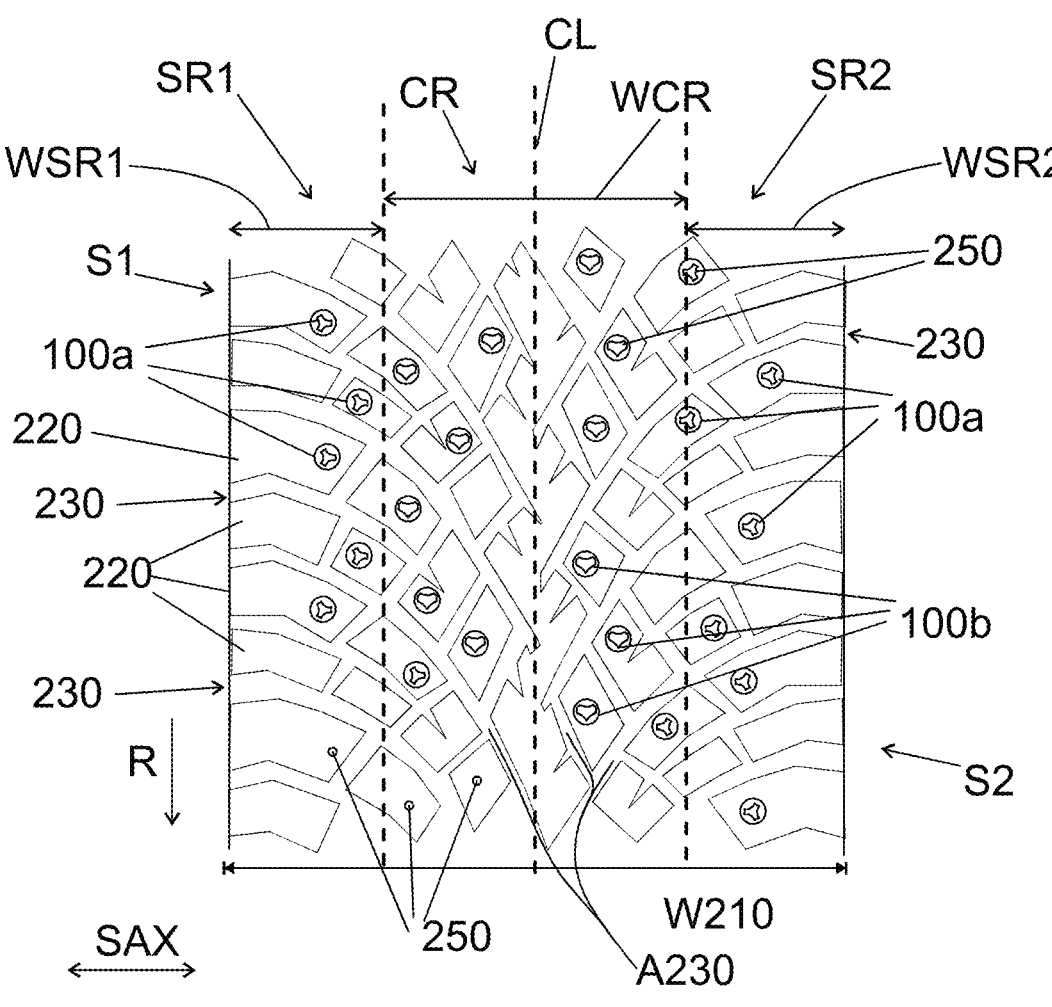
Fig. 2f
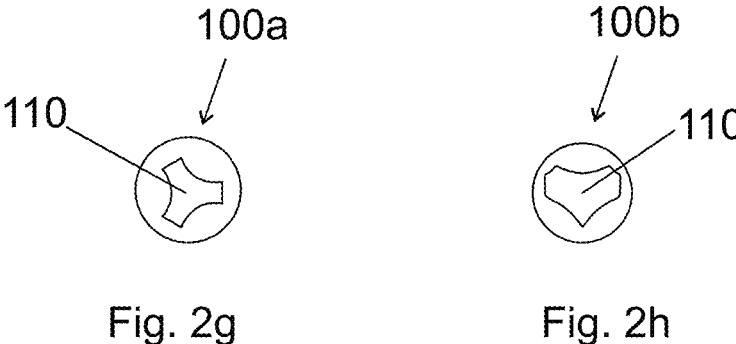
Fig. 2g                    Fig. 2h

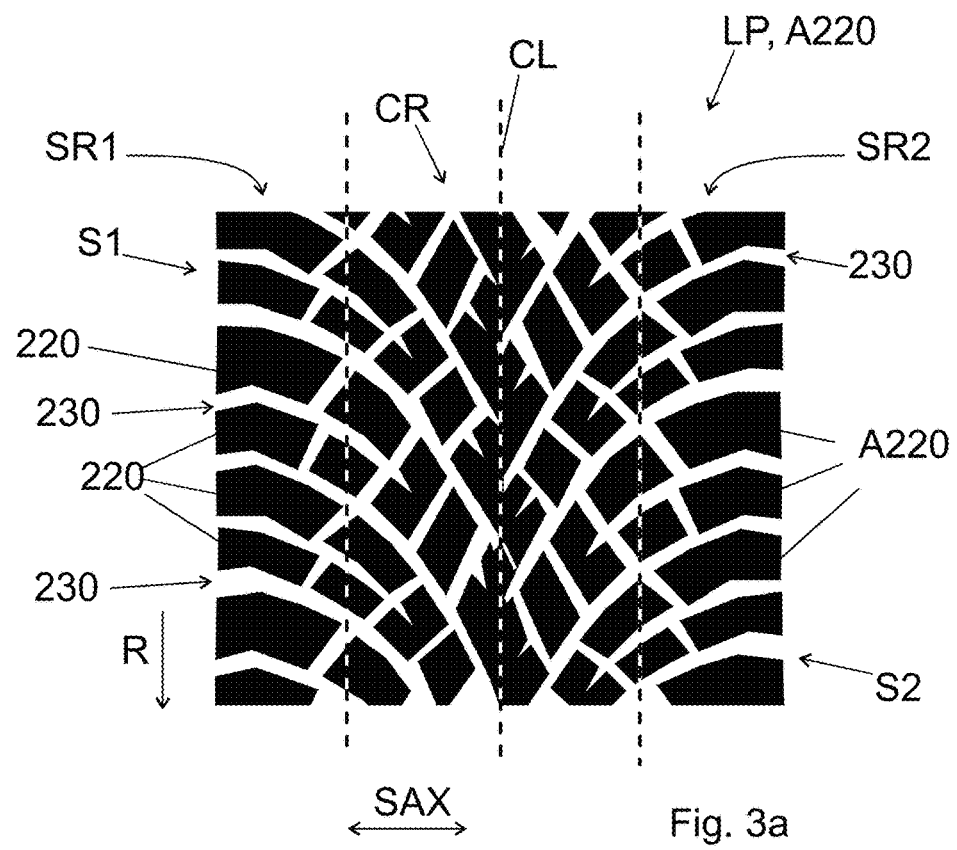
Fig. 3a
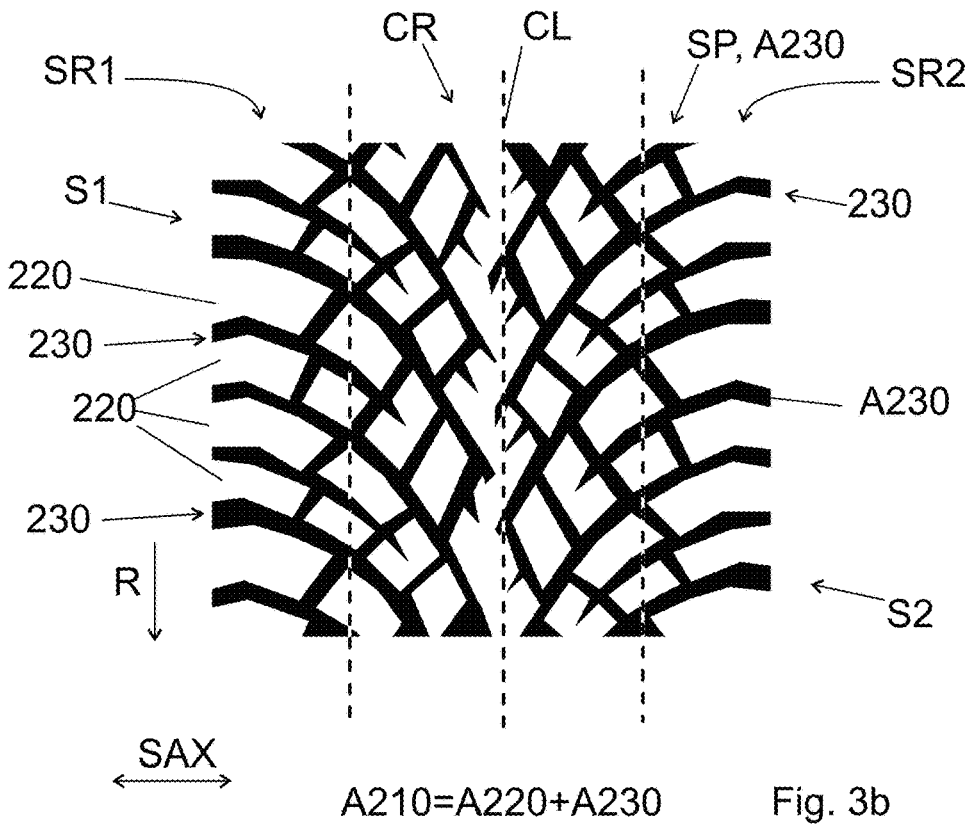
A210=A220+A230 Fig. 3b

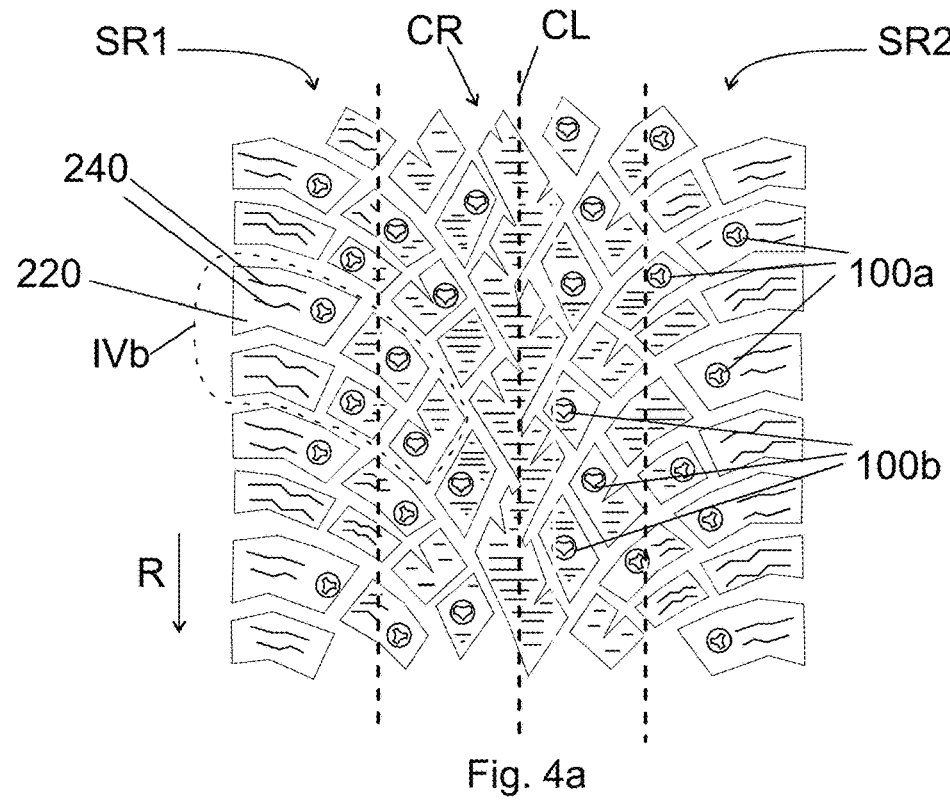
Fig. 4a
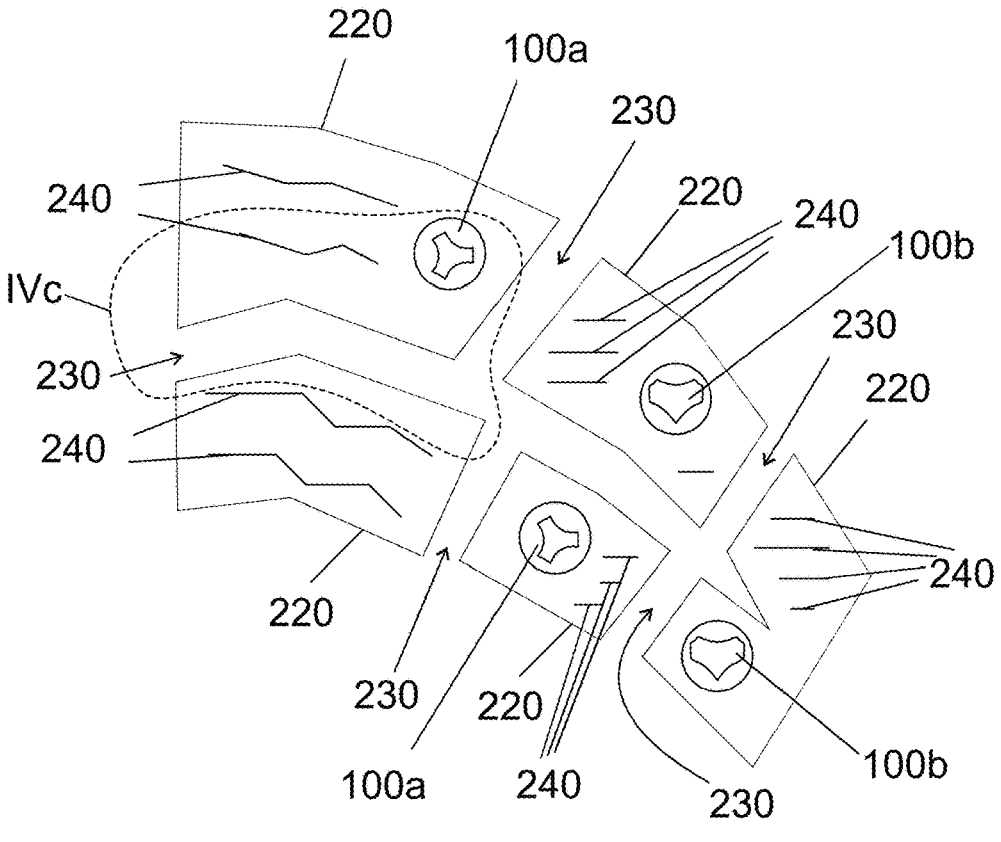
Fig. 4b (IVb)

Fig. 4c (IVc)

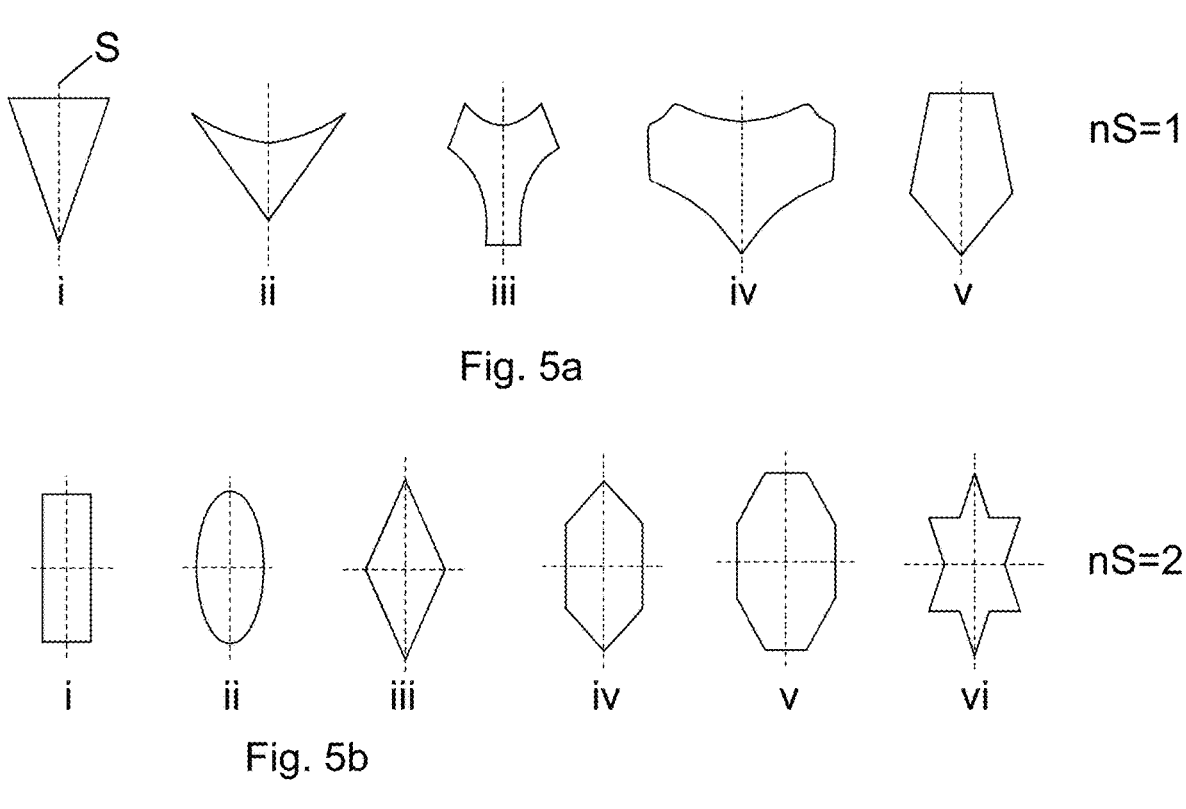
Fig. 5a
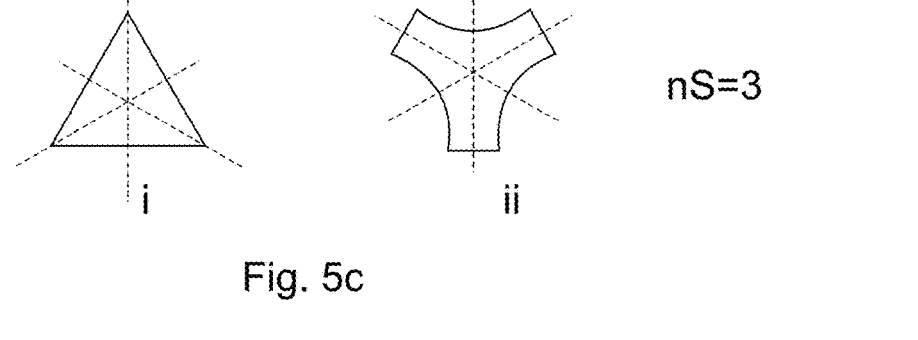
Fig. 5b
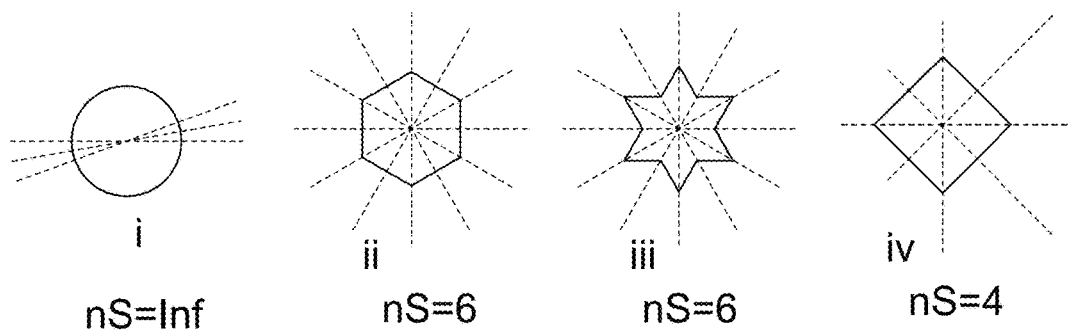
Fig. 5c
Fig. 5d

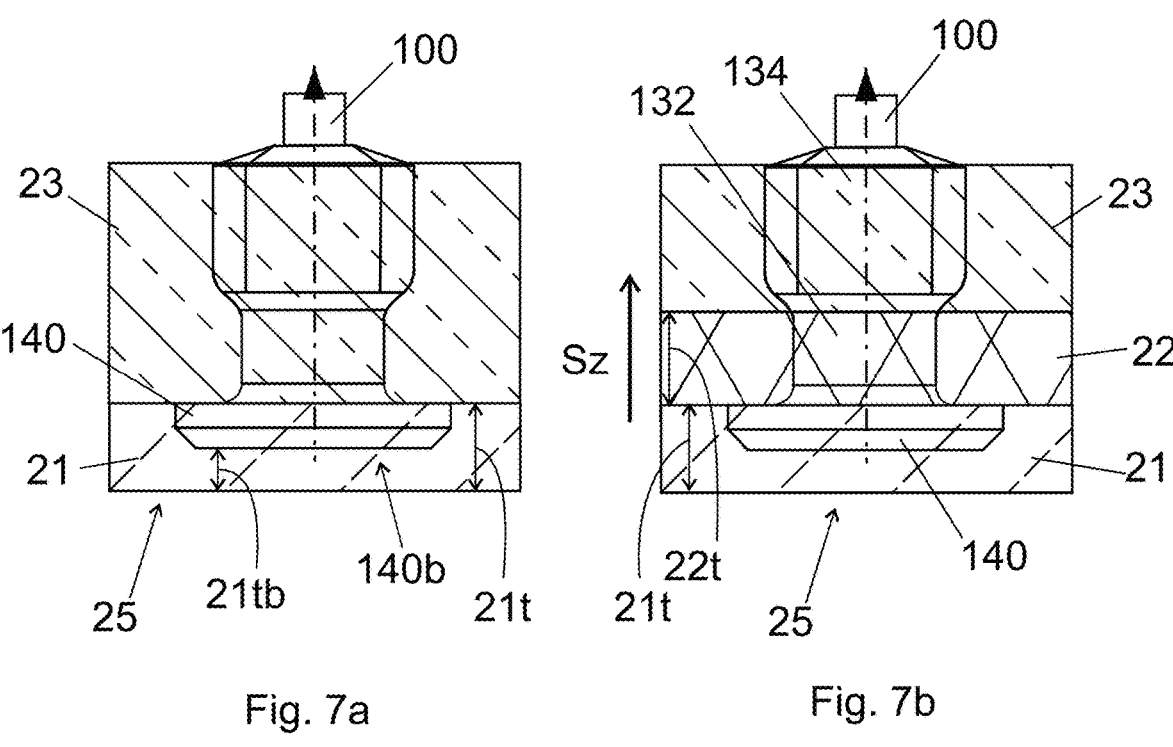
Fig. 7a                    Fig. 7b
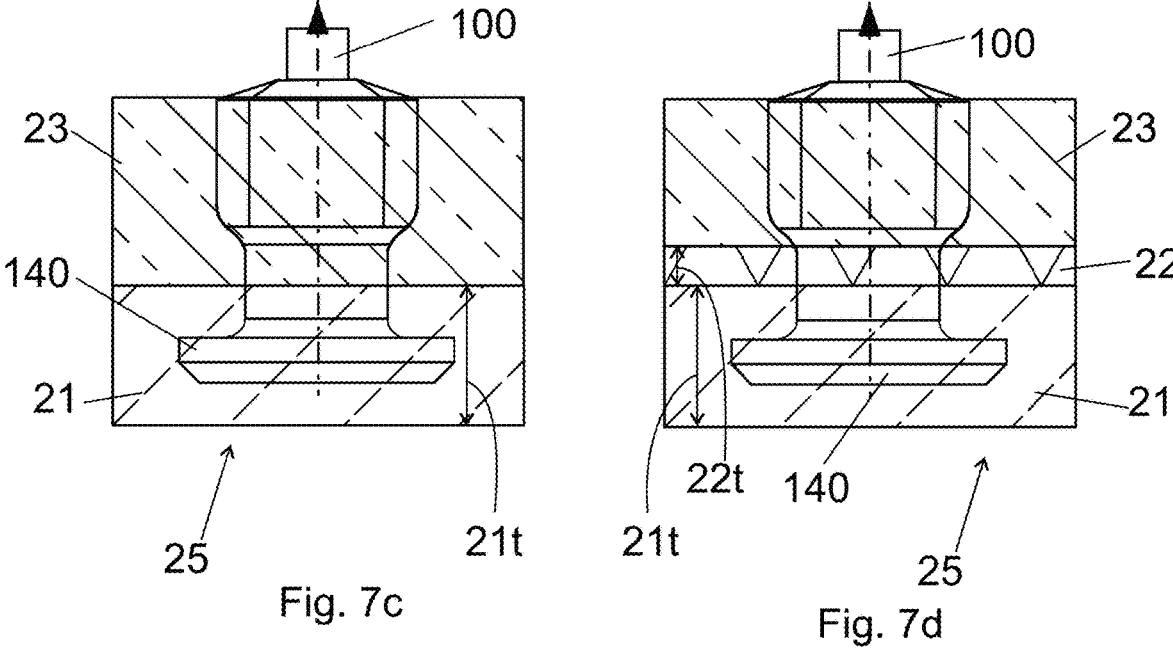
Fig. 7c                    Fig. 7d

STUDDED TYRE HAVING GROOVES

CROSS-REFERENCE TO RELATED APPLICATION

The present application claims priority to European Patent Application No. 23172083.0 filed on May 8, 2023, which application is incorporated herein by reference in its entirety.

TECHNICAL FIELD

The invention relates to studded tyres. The invention relates to studded pneumatic tyres. The invention relates to studded pneumatic tyres for cars.

BACKGROUND

Functions of a tyre on an automotive vehicle include providing sufficient traction for accelerating, driving, and braking; and providing adequate steering control particularly at high speeds. Traction is commonly referred to as grip and steering control as handling. There is a constant need for improving grip and handling of tyres.

Grip is affected also by the ground on which the tyre is commonly used. Winter tyres, which are intended for icy roads, are commonly equipped with studs to improve grip on ice. However, the weather may change so that winter tyres need to be usable also on roads, on which there is water, slush, and/or snow. Naturally, also winter tyres need to be usable on dry road.

Grip on roads having water and/or slush are improved, when the water and/or slush is adequately driven away from a contact area between the road and the tyre tread. Thus, in principle, by using large grooves, water is well driven away. However, too many grooves and/or too large groove may worsen handling on bare roads and/or reduce grip, because stability of the tread blocks are reduced and tread blocks are more subject to deformation. Grip on snow, as well as on ice, may be improved by using softer material, provided by the softness of the rubber material as such and/or by sipes provided on the tread. However, too soft material and/or too many sipes may worsen handling.

SUMMARY

It has been found how good handling and grip properties of a studded tyre can be simultaneously achieved. According to a first aspect of the invention, an average land ratio of the studded tyre is within a certain limit as detailed in the claims and in the description. According to a second aspect of the invention, a land ratio of a central area of a tread of the studded tyre is greater than either or both land ratios of the shoulder areas of the tread of the studded tyre. According to a third aspect of the invention, a density of sipes on a central area of a tread of the studded tyre is greater than a density/the densities of sipes on one or both of the shoulder areas of the tread of the studded tyre. These aspects are reflected in the independent claim as well as in the dependent claims.

BRIEF DESCRIPTION OF THE DRAWINGS

FIG. 1b shows the view/detail Ib of FIG. 1a. This is indicated by the reference "(Ib)" near the figure number "FIG. 1b". In line with this, one can see the text "FIG. 1b (Ib)" on the figure page 1/10. Similar notation is used in other figures, too, as detailed below.

FIG. 1a shows a stud in a side view,

FIG. 1b shows a cross-section Ib of a pin of the stud of FIG. 1a, the cross-section Ib indicated in FIG. 1a, FIG. 1c shows a cross-section Ic of a second flange of the stud of FIG. 1a, the cross-section Ic indicated in FIG. 1a, FIG. 1d shows a cross-section Id of a waist of the stud of FIG. 1a, the cross-section Id indicated in FIG. 1a, FIG. 1e shows a cross-section Ie of a base flange of the stud of FIG. 1a, the cross-section Ie indicated in FIG. 1a, FIG. 1f shows the stud in a side view and further measures thereof, FIG. 2a shows a tyre in a perspective view, FIG. 2b shows schematically a circumference of a tyre in a side view, FIG. 2c shows a part of a tyre in a perspective view, FIG. 2d shows a half of a cross-section of a tyre with some measures, FIG. 2e shows a quarter of a cross-section of a tyre, FIG. 2f shows a part of a tread of a tyre, FIG. 2g shows a stud of a first type in a top view, FIG. 2h shows a stud of a second type in a top view, FIG. 3a shows a part of a land portion of a tread in black colour, FIG. 3b shows a part of a sea portion of a tread in black colour, FIG. 4a shows a part of a tread provided with sipes, grooves, and studs, FIG. 4b shows the detail IVb of FIG. 4a, FIG. 4c shows the detail IVc of FIG. 4b, FIGS. 5a to 5d show cross-sections of pins of studs, FIG. 7a shows schematically a stud arranged on an underlayer and penetrating through a cap, FIG. 7b shows schematically a stud arranged on an underlayer and penetrating through an intermediate layer and a cap, FIG. 7c shows schematically a stud arranged on an underlayer and penetrating through a cap, FIG. 7d shows schematically a stud arranged on an underlayer and penetrating through an intermediate layer and a cap.

DETAILED DESCRIPTION

Figure 1A:
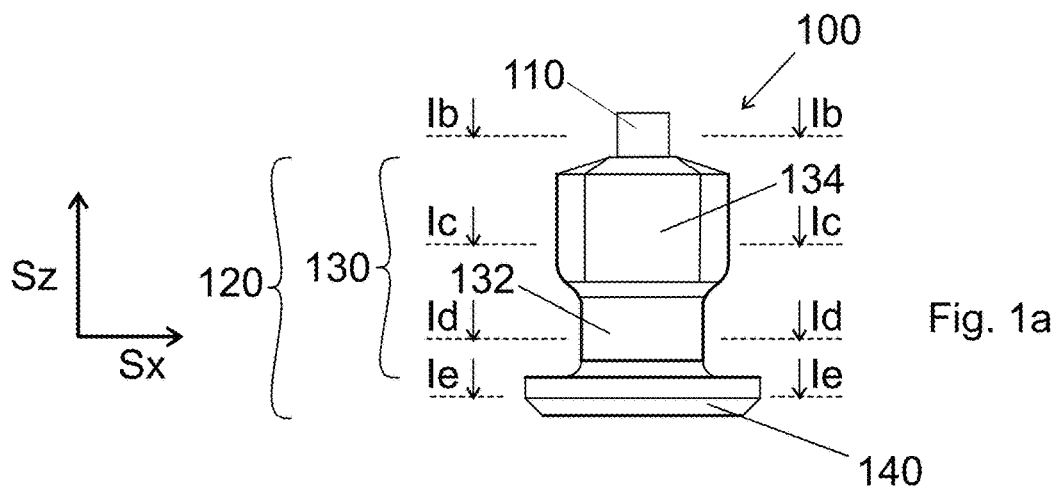
FIGS. 1a to 1e show different views of a stud. The different views/details have been indicated close to the number of the figure. Thus, e.g.

FIG. 2a shows a studded tyre 200. A studded tyre 200 comprises a tread 210 and studs 100 provided in the tread 210. Referring to FIG. 2c, the studs 100 have been installed into stud holes 250. The stud holes may be made to the tread 210 during vulcanization of the tread material. The studded tyre 200 is a tubeless tyre, i.e. functional on a rim and without an inner tyre. In particular, the tyre may be a tyre for a vehicle of class M1 or N1 as defined in the Consolidated Resolution on the Construction of Vehicles (R.E.3), document ECE/TRANS/WP.29/78/Rev.4, para. 2. These classes are:

M1: Vehicles used for the carriage of passengers and comprising not more than eight seats in addition to the driver's seat, and N1: Vehicles used for the carriage of goods and having a maximum mass not exceeding 3.5 tonnes.

Referring to FIGS. 2c and 2f, the tread 210 of the studded tyre 200 comprises tread blocks 220 such that grooves 230 are arranged between the tread blocks 220. In this specification, a "rib" is considered as a large tread block 220. For example, the tread of FIGS. 2c and 2f include a tread block that extends over the entire circumference of the tread 210, even if such a tread block could be called a central rib. A tread 210 needs not comprise a tread block that extends circumferentially throughout the tread 210. In addition, the tyre 200 comprises studs 100, which have been installed into at least some of the tread blocks 220. Referring to FIG. 1a, a stud 100 preferably comprises a pin 110, and preferably each stud 100 of the tyre 200 comprises a pin 100. Moreover, in the tyre 200, at least the pins 110 of the studs 100 are exposed on the tread 210 (see e.g. FIG. 2e).

Some measures of a tyre 200 are depicted in FIG. 2d. Within this description, the width W200 of the tyre 200, as shown in FIG. 2d, refers to the "Section Width" as defined in the Standards Manual 2023 of the European Tyre and Rim Technical Organization (ETRTO). The height H200 of the tyre 200 is also shown in FIG. 2d, and is defined as the "Section Height" in the ETRTO Standards Manual 2023. Correspondingly, the Section Width, i.e. the width W200 of the tyre 200 as defined herein (and in the ETRTO standards manual) is the linear distance between the outsides of the sidewalls of an inflated tyre excluding elevations due to labelling (markings), decoration, or protective bands or ribs. FIG. 2d also shows half of a cross-section of a rim 300 onto which the tyre 200 has been installed.

In practice, the tyre width W200 is related to the size marking shown on the tyre 200. In general, the size marking is shown on a tyre as w/hRr, wherein w denotes a width, h an aspect ratio and r a radius. According to the ETRTO standards manual, typical size markings refer to Design Width (i.e. the width W200 of the tyre 200) and an overall diameter as shown in the Table 1 below:

The tread blocks 220 of the tyre 200 define a land portion LP of the tread 210. A part of the land portion LP of the tread is shown by black colour in FIG. 3a. Naturally, the land portion extends around the whole circumference of the tread 210. The land portion of the tread 210 consists of the parts of the tread blocks 220 that are arranged to contact a surface (e.g. the road or ground on which the vehicle equipped with the tyre used) in use of the tyre 200. The land portion has a total land area A220 (as measured e.g. in units of $dm^2$). Some of the tread blocks 220 of the tyre 200 have been provided with studs, and also the cross-sections of the studs 100 belong to the land portion LP. In this description, the total land area A220 refers to the area of only the radially outward facing side of the land portion.

The tread blocks 220 of the tyre 200 define an envelope surface. The envelope surface consists of the land portion LP of the tread 210 and the regions defined by the openings of the grooves 230. The openings of the grooves 230 may be commonly referred to as a sea portion SP of the envelope surface, as shown in black colour in FIG. 3b. Also the sea portion SP extends around the whole circumference of the tread 210. The sea portion SP of the envelope surface has a sea area A230. The land portion LP (FIG. 3a) and the sea portion SP (FIG. 3b) together form the envelope surface. Thus, the tread blocks 220 are delimited outward in the radial direction +SR by the envelope surface; and the land portion of the envelope surface forms the ground contact surface of the tread 210. The envelope surface has a total envelope area A210, as measured e.g. in units of $dm^2$. In this description, the total envelope area A210 refers to the area of only the radially outward facing side of the envelope surface, even if the envelope surface has also an inner side.

Thus, the total envelope area A210 is the sum of the land area A220 and the sea area A230, i.e. A210=A220+A230. Referring to FIGS. 2a and 2b, a width of the tread 210 is depicted by W210 and a circumference by C210. The total

TABLE 1

| | | | | | | | | |
|---|---|---|---|---|---|---|---|---|
| Tyre width and diameter indicated by a size marking of a tyre. | | | | | | | | |
| Size | Section Width (mm) | Overall Diameter (mm) | Size | Section Width (mm) | Overall Diameter (mm) | Size | Section Width (mm) | Overall Diameter (mm) |
| 145/55R16 | 150 | 566 | 205/55R15 | 214 | 607 | 255/55R16 | 265 | 686 |
| 155/55R14 | 162 | 526 | 205/55R16 | 214 | 632 | 255/55R17 | 265 | 712 |
| 155/55816 | 162 | 576 | 205/55R17 | 214 | 658 | 255/55R18 | 265 | 737 |
| 165/55R14 | 170 | 538 | 205/55R18 | 214 | 683 | 255/55R19 | 265 | 763 |
| 165/55R15 | 170 | 563 | 205/55R19 | 214 | 709 | 255/55R20 | 265 | 788 |
| 175/55R15 | 182 | 573 | 215/55R16 | 226 | 642 | 255/55R21 | 265 | 813 |
| 175/55R16 | 182 | 598 | 215/55R17 | 226 | 668 | 265/55R18 | 277 | 749 |
| 175/55R17 | 182 | 624 | 215/55R18 | 226 | 693 | 265/55R19 | 277 | 775 |
| 175/55818 | 182 | 649 | 215/55R19 | 226 | 719 | 265/55R20 | 277 | 800 |
| 175/55R20 | 182 | 700 | 225/55R16 | 233 | 654 | 275/55R15 | 284 | 683 |
| 185/55R14 | 195 | 560 | 225/55R17 | 233 | 680 | 275/55R16 | 284 | 708 |
| 185/55R15 | 195 | 585 | 225/55R18 | 233 | 705 | 275/55R17 | 284 | 734 |
| 185/55R16 | 195 | 610 | 225/55R19 | 233 | 731 | 275/55R18 | 284 | 759 |
| 195/55R15 | 201 | 595 | 235/55R16 | 245 | 664 | 275/55R19 | 284 | 785 |
| 195/55816 | 201 | 620 | 235/55R17 | 245 | 690 | 275/55R20 | 284 | 810 |
| 195/55R17 | 201 | 646 | 235/55R18 | 245 | 715 | 275/55R21 | 284 | 835 |
| 195/55R18 | 201 | 671 | 235/55R19 | 245 | 741 | 285/55R18 | 297 | 771 |
| 195/55R19 | 201 | 697 | 235/55R20 | 245 | 766 | 285/55R19 | 297 | 797 |
| 195/55R20 | 201 | 722 | 245/55R16 | 253 | 676 | 305/55R20 | 316 | 855 |
| 195/55R21 | 201 | 747 | 245/55R17 | 253 | 702 | 325/55R22 | 336 | 917 |
| | | | 245/55R18 | 253 | 727 | | | |
| | | | 245/55R19 | 253 | 753 | | | |

It is noted that Table 1 shows only some examples. A tyre may have a different size, in particular another aspect ratio than 55.

envelope area A210 is thus approximately equal to the product W210×C210. However, because the tread 210 is curved also in the axial direction SAX on the tyre 200, this is only an approximation. As for the circumference C210, the circumference C210 may equal pi (i.e. 3.14) times the overall diameter indicated in Table 1.

In this description, an average land ratio refers to the ratio of the total land area A220 to the total envelope area A210. In other words, by land ratio is meant the ratio of the ground contacting surface area of tread blocks to the imaginary ground contacting area of the tread, the imaginary ground contacting area of the tread including spaces (i.e. groove openings) between adjacent blocks and the blocks them-selves. In other words, by land ratio is meant the ratio of the ground contacting surface area of tread blocks to a ground contacting area of an imaginary tread, the imaginary tread having been formed from the tread by filling the grooves with tread material.

In the art, one sometimes uses the term sea area ratio to mean the ratio of the sea area to the imaginary ground contacting area of the tread. In line with these definitions the sum of the land ratio and the sea area ratio equals one.

In the art, the term "land-to-sea ratio" may, occasionally, be used interchangeably with the land ratio as defined above. However, the term land-to-sea ratio or land/sea ratio may relate to a ratio of the land area (ground contacting area) to the sea area (the non-contacting area only) of the tread. To avoid possible confusion, the term land area is used through-out this description and in the meaning defined above.

According to the first aspect of the invention the average land ratio of the tyre 200 is 55% to 78%. Preferably, the average land ratio of the tyre 200 is 61% to 75%, and more preferably 65% to 72%. The most preferable value is about 67%. This improves drainage of water and/or slush from underneath the studded tyre, when used on wet surface.

In general, increasing the land ratio improves the grip on dry road (including ice), but at the same time decreases the grip on wet and snowy roads (having water and/or slush). The range disclosed above has been found to provide an optimal compromise in studded tyres, which are used during winter.

As shown in Table 2 below, when the average land ratio increases, the grip on ice also improves.

According to the second aspect of the invention, a land ratio of the tread is greater in a central area than in a shoulder area. FIGS. 3*a* and 3*b* therefore show a circumferential central line CL of the tread 210. The circumferential central line CL divides the tread 210 to two equally wide parts. The circumferential central line CL is an intersection of the tread 210 and its equatorial plane EP. As shown in FIG. 3*a*, a central region CR of the tread 210 is arranged between a first shoulder region SR1 of the tread 210 and a second shoulder region SR2 of the tread 210. The central region CR com-prises the circumferential central line CL of the tread 210. In an embodiment, the circumferential central line CL of the tread 210 divides also the central region to two equally wide parts. Limits between these regions (SR1 and CR; and CR and SR2) are shown by dash lines without a reference in FIGS. 3*a* and 3*b*. The circumferential central line CL is also shown by a dash line. The first shoulder region SR1 extends in an axial direction SAX from a first side S1 of the tread 210 towards the circumferential central line CL. The second shoulder region SR2 extends in an axial direction SAX from a second side S2 of the tread 210 towards the circumferential central line CL. In an embodiment, the first shoulder region SR1, the second shoulder region SR2 and the central region CR constitute the tread 210. In other words, in the embodi-ment, the tread 210 consists of the first shoulder region SR1, the second shoulder region SR2 and the central region CR.

The tread blocks 220 define the land portion LP of the tread and the envelope surface as detailed above.

The land portion LP of the tread has a central land area. The central land area is the area of the part of the land portion LP of the tread 210 that belongs to the central region CR. The land portion LP of the tread has a first shoulder land area. The first shoulder land area is the area of the part of the land portion LP of the tread 210 that belongs to the first shoulder region SR1. The land portion LP of the tread has a second shoulder land area. The second shoulder land area is the area of the part of the land portion LP of the tread 210 that belongs to the second shoulder region SR2. Reference is made to FIG. 3*a*.

TABLE 2

| | | | grip and handling properties of three tyres. | | | | | | | |
|---|---|---|---|---|---|---|---|---|---|---|
| 205/ 55R16 | Load Index | Speed rating | Average land ratio (%) | Central land ratio (%) | Shoulder land ratio (%) | Difference, percentage points | Acceler- ation on ice | ABS braking on ice | Circle handling index | Ice handling index |
| Tyre A | 94 | T | 67.6 | 66.5 | 68.8 | −2.3 | 100.0 | 100.0 | 100.0 | 100.0 |
| Tyre B | 94 | T | 70.8 | 71.5 | 70.1 | 1.4 | 104.3 | 104.6 | 101.0 | 100.6 |
| Tyre C | 94 | T | 67.6 | 66.5 | 68.8 | −2.3 | 65.9 | 72.8 | 91.4 | 87.4 |

For the data shown in Table 2, three tyres (A, B, and C) were tested. The tyres A and C are identical except that A has been provided with studs, while the tyre C lacks studs. As expected, the tyre A performs much better on ice than the tyre C. For the tyre B, the average land ratio was increased, compared to the tyre A. In addition, the land ratio was optimized so that in the tyre B (unlike in the tyre A), the central land ratio was greater than the shoulder land ratio. In the Table 2 the acceleration, braking, circle handling, and ice handling results are given in relative terms. A higher number indicates better performance. As shown by the results, the grip and handling on ice improves when the average land ratio is increased. As indicated therein, the tyre B is superior compared to the tyre A.

The envelope surface (i.e. the combination of the land portion LP and the sea portion SP) has a central envelope area. The central envelope area is the area of the part of the envelope surface that belongs to the central region CR. The envelope surface has a first shoulder envelope area. The a first shoulder envelope area is the area of the part of the envelope surface that belongs to the first shoulder region SR1. The envelope surface has a second shoulder envelope area. The second shoulder envelope area is the area of the part of the envelope surface that belongs to the second shoulder region SR2. Reference is made to FIGS. 3*a* and 3*b*; with the note that the envelope surface is the combination of the land portion (shown in FIG. 3*a*) and the sea portion (shown in FIG. 3*b*).

The tyre has a central land ratio of the tyre 200. The central land ratio is defined as a ratio of the central land area to the central envelope area. According to the second aspect of the invention the central land ratio is 1 to 30 percentage points greater than either or both of a first shoulder land ratio and a second shoulder land ratio. Preferably, the central land ratio is 1.5 to 25 percentage points greater than either or both of a first shoulder land ratio and a second shoulder land ratio. More preferably, the first shoulder land ratio and the second shoulder land ratio are equal.

Herein the first shoulder land ratio is the ratio of the first shoulder land area to the first shoulder envelope area and the second shoulder land ratio is the ratio of the second shoulder land area to the second shoulder envelope area.

Thus, according to the second aspect of the invention proportionally more grooves are arranged in the shoulder region(s) SR1, SR2 than in the central region CR. This improves drainage of water and/or slush from underneath the tyre, when used on wet and/or snowy surface. This shows e.g. as widening of the grooves towards the sides of the tread, as clearly seen from FIG. 3*b*. It is noted that FIG. 2*f* shows, as an example, a tread 210 having such land ratios (and, optionally, an average land ratio, too) provided with studs 100*a*, 100*b*. Naturally, the second aspect of the invention works particularly well when also the average land ratio is within the limits defined by the first aspect of the invention.

Preferably both the shoulder regions SR1, SR2 have substantially equal land ratios. Thus, preferably, a ratio of the first shoulder land ratio to the second shoulder land ratio is 0.8 to 1.2 such as 0.9 to 1.1.

What has been said above concerning the land ratios of the tyre have been found to function well at least in tyre of the classes M1 or N1 (see above). This is also related to a width of the tread 210 of the tyre, since the water/slush is intended to be drained away from the contact area of the tread. Thus, preferably, the tyre 200 has a width W200 that is 150 mm to 350 mm. The width W200 of the tyre 200 is shown in FIG. 2*d*. Preferably also a first width W210 of the tread 210 is 150 mm to 350 mm. The first width W210 is shown in FIGS. 2*a* and 2*f*.

The first width W210 (i.e. that of the tread) may be equal to the reference tread width as defined in the ETRTO standards manual 2023 (see Design Guide, Page PC.7). In accordance with the definitions therein, the reference tread width C is calculatable as $$C = (1.075 - 0.005ar)s^{1.001}$$

Herein s is the Section Width (defined above), i.e. the width W200 of the tyre, and ar is the nominal aspect ratio, which is readable from the size marking w/hRr (see above), the "h" indicating the aspect ratio. Thus, the first width W210 of the tread 210 may equal the value C as calculatable with the equation given above, wherein s equals W200.

Such a tyre is preferably manufactured by vulcanizing a green tyre to form the tyre 200 and forming stud holes 250 to the tread 210 of the tyre 200 during the vulcanizing the green tyre.

To improve the grip, the tread 210 is sufficiently soft. The softness can be affected by tread material as such and by using sipes. Thus, in an embodiment, the tread 210 comprises rubber material having a Shore hardness in the range 48 to 59 Sh(A) as measured with durometer type A, at the temperature 23° C.

In an embodiment, the tread 210, in particular the part of the tyre that is configured to contact a road in use, is formed of rubber material having a Shore hardness in the range 48 to 59 Sh(A) as measured with durometer type A, at the temperature 23° C. In an embodiment, at least some of the tread blocks 220 are provided with sipes 240. Preferably all the tread blocks 220 have been provided by at least one sipe 240. Sipes 240 are shown in FIGS. 4*a*, 4*b*, 4*c*, and 4*d*.

A tyre having sipes is preferably manufactured by vulcanizing a green tyre to form the tyre 200 and forming the sipes 240 to the tread 210 of the tyre 200 during the vulcanizing the green tyre by using lamella blades.

In accordance with the third aspect of the invention, a density of sipes on a central region of a tread of the studded tyre is greater than a density of sipes on one or both of the shoulder regions of the tread of the studded tyre. Herein the term density of sipes refers to the total length of the sipes 240, which open to the land portion LP of the tread, as divided by the area of the envelope surface. Thus, a unit of the density of sipes is a unit of a length divided by a unit of an area, e.g. cm/dm² or dm/dm². Moreover, the length of the sipe 240 is defined at the level of the opening of the sipe 240. Thus, the length of the sipes 240 measured on the tread surface.

More specifically, according to the third aspect of the invention, at least some of the tread blocks 220 of the central region CR of the tread 210 are provided with sipes 240 such that the tyre 200 has a first density of sipes 240. Herein the first density of sipes refers to the density of the sipes in the central region CR. Thus, the first density of sipes 240 is defined as a total length of the sipes 240 arranged in the central region CR, the length measured on the tread surface, divided by the area of the central region CR. The area of the central region refers to the area of the part of the envelope surface that belongs to the central region, i.e. including the sea portion of the tread that belongs to the central region. More precisely, the total length of the sipes 240 arranged in the central region CR refers to the sum of the lengths of the sipes 240 (or parts thereof) that are arranged in the central region CR, the length of each sipe being measured on tread surface of the tyre. The tyre is preferably an unworn tyre.

At least some of the tread blocks 220 of the first shoulder region SR1 are provided with sipes 240 such that the tyre 200 has a second density of sipes 240. Herein the second density of sipes refers to the density of the sipes in the first shoulder region SR1. Thus, the second density of sipes 240 is defined as a total length of the sipes 240 arranged in the first shoulder region SR1, the length measured on the tread surface, divided by the area of the first shoulder region SR1. The area of the first shoulder region SR1 is the area of the part of the envelope surface that belongs to the first shoulder region. More precisely, the total length of the sipes 240 arranged in the first shoulder region SR1 refers to the sum of the lengths of the sipes 240 (or parts thereof) that are arranged in the first shoulder region SR1, the length of each sipe being measured on tread surface of the tyre. The tyre is preferably an unworn tyre.

At least some of the tread blocks 220 of the second shoulder region SR2 are provided with sipes 240 such that the tyre 200 has a third density of sipes 240. Herein the third density of sipes refers to the density of the sipes in the second shoulder region SR2. Thus, the third density of sipes 240 is defined as a total length of the sipes 240 arranged in the second shoulder region SR2, the length measured on the tread surface, divided by the area of the second shoulder region SR2. The area of the second shoulder region SR2 is the area of the part of the envelope surface that belongs to the second shoulder region. More precisely, the total length of the sipes 240 arranged in the second shoulder region SR2 refers to the sum of the lengths of the sipes 240 (or parts thereof) that are arranged in the second shoulder region SR2, the length of each sipe being measured on tread surface of the tyre. The tyre is preferably an unworn tyre.

In accordance with the third aspect of the invention the first density of sipes 240 is at least 15% greater than either or both of the second density of sipes 240 and the third density of sipes 240. Preferably, the first density of sipes 240 is at least 25% greater than either or both of the second density of sipes 240 and the third density of sipes 240. Preferably, the first density of sipes 240 is at least 15% or at least 25% greater than both of the second density of sipes 240 and the third density of sipes 240. More preferably, the first density of sipes 240 is at least 30% greater or at least 35% than either or both of the second density of sipes 240 and the third density of sipes 240. In a preferable embodiment, the second density of sipes is equal to the third density of sipes. In a preferable embodiment, the tyre is not anti-symmetric.

The difference in the densities of sipes has the effect that the tread in the central region is less rigid than at the shoulder region(s) SR1, SR2. This improves grip on snowy surfaces.

Also preferably, the second and third densities of sipes are substantially equal. More specifically, preferably a ratio of the second density of sipes to the third density of sipes is 0.8 to 1.2, more preferably 0.9 to 1.1.

As an example, a tyre comprises, in the central region CR sipes 240 so that first density of sipes, i.e. the ratio of a total length of the sipes in the central region CR to an area of such a part of the envelope surface that belongs to the central region CR, is 72 cm/dm². As conventional, dm² refers to square decimetre, i.e. (dm)². The total length of the sipes in the central region CR is measured as defined above. Moreover, the tyre comprises such first and second shoulder regions SR1 and SR2 that are equally wide. The tyre comprises in the first shoulder region SR1 sipes so that the second density of sipes, i.e. a ratio of the total length of the sipes in the first shoulder region SR1 to an area of such a part of the envelope surface that belongs to the first shoulder region SR1, is 51 cm/dm². The tyre is not antisymmetric, whereby the tyre comprises in the second shoulder region SR2 sipes so that the third density of sipes, i.e. a ratio of the total length of the sipes in the second shoulder region SR2 to an area of such a part of the envelope surface that belongs to the second shoulder region SR2, is also 51 cm/dm². In this example, the tread consists of the central region CR, the first shoulder region SR1 and the second shoulder region SR2. Moreover, a width WCR of the central region CR was 37% of the width W200 of the tyre 200.

As calculatable from the values given above, in this specific example, the first density of sipes is 41% greater than the second density of sipes. Since the second density of sipes equals the third density of sipes, the first density of sipes is 41% greater than the third density of sipes.

An area of the envelope surface depends on the size of the tyre. However, the area may be e.g. of the order of 20 dm² to 80 dm² giving and idea of the total length of the sipes in the whole tread.

Figure 4D:
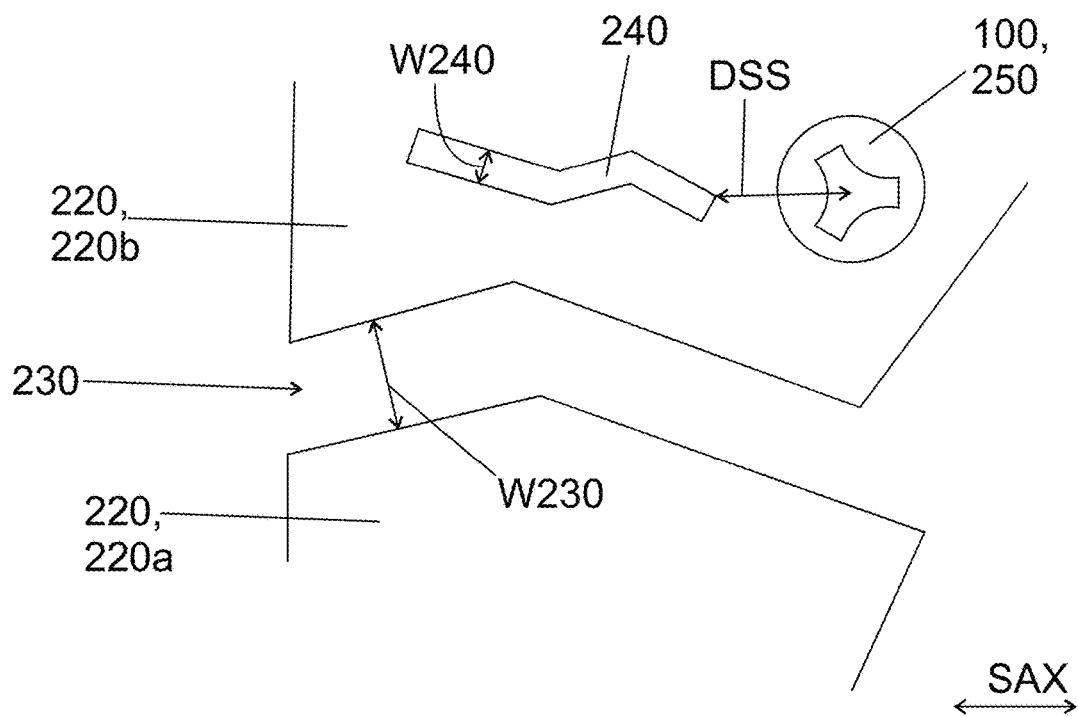
FIG. 4d shows schematically tread blocks, a groove, a sipe and a stud.
Figure 4D:
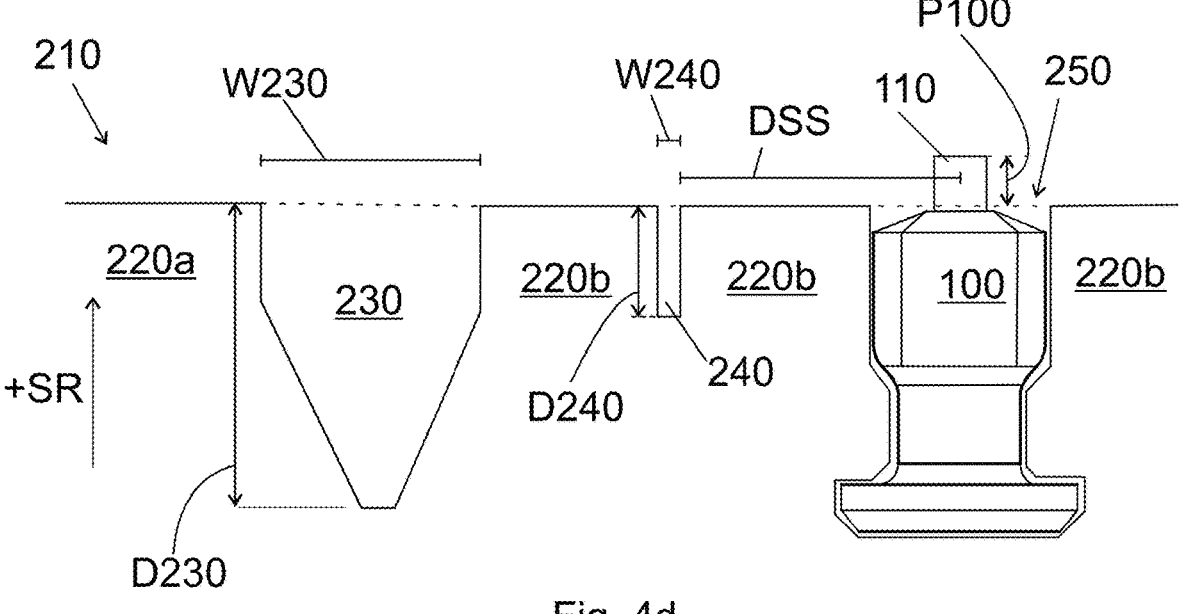

In addition, preferably, no sipe 240 is provided close to a stud hole 250, in which a stud has been installed. Referring to FIG. 4c, a stud has been installed in a stud hole 250, and no part of any of the sipes 240 is arranged closer than 6 mm to a centre of the stud hole 250. Preferably, no part of any of the sipes 240 is arranged closer than 8 mm or closer than 10 mm to a centre of the stud hole 250. In addition or alternatively, multiple studs have been installed in multiple stud holes and no part of any of the sipes 240 is arranged closer than 6 mm, 8 mm, or 10 mm to a centre of any one of the stud holes 250. FIGS. 4c and 4d show the distance DSS such that no part of any of the sipes 240 is arranged closer than the distance DSS to a centre of the stud hole 250. The distance DSS may be e.g. 6 mm, 8 mm, or 10 mm. This has the effect that stud 100 is reliably fixed to its stud hole. Otherwise the sipe 240 would soften the tread also near the stud hole 250 and in this way increase the risk of the stud 100 falling from the stud hole 250. Thus, this also improves the grip of the tyre 200; as the studs improve grip only when present.

However, because the sipes 240 provide for additional grip through effective softening the tread and providing further edges of tread material, preferably at least one or some of the sipes are arranged reasonably close to the stud. Thus, in a preferable embodiment, a stud has been installed in a stud hole 250 such that a part of a sipe 240 is arranged closer than 12 mm to a centre of the stud hole 250. More preferably, a stud has been installed in a stud hole 250 such that a part of a sipe 240 is arranged closer than 10 mm (or closer than 9 mm) Thus, in an embodiment, the tyre comprises such a stud and such a sipe that a distance from a part of the sipe to a centre of the stud hole 250 is, e.g., 6 to 12 mm, 6 to 10 mm, 6 to 9 mm, 8 to 12 mm, 8 to 10 mm, or 8 mm to 9 mm (one significant digit, and in line with the text above, excluding the upper end-points of these ranges but including the lower end-points of these ranges). It is noted that the reference DSS only stands for such a measure that no part of any of the sipes 240 is arranged closer than the distance DSS to a centre of the stud hole 250. to a centre of the stud hole 250.

Most preferably, a stud has been installed in a stud hole 250, and no part of any of the sipes 240 is arranged closer than 8 mm to a centre of the stud hole 250 and a part of at least one of the sipes is arranged closer than 10 mm to a centre of the stud hole 250. Preferably this applies to multiple studs so that parts of different sipes may be close to different stud holes. Thus, preferably, at least parts of multiple studs (100, 100a, 100b) are arranged in multiple stud holes 250 provided in multiple tread blocks 220, and no part of any of the sipes 240 is arranged closer than 6 mm to a centre of any one of the stud holes 250 (preferably no part is arranged closer than 8 mm to a centre of any one of the stud holes 250); and the tyre comprises multiple such sipes that a part of each one of the multiple sipes 240 is arranged closer than 12 mm (preferably closer than 10 mm) to a centre a stud hole 250 to which a stud has been arranged.

The third aspect of the invention may be used in combination with the first aspect of the invention (only). The third aspect of the invention may be used in combination with the second aspect of the invention (only). The third aspect of the invention may be used in combination with both the first and the second aspects of the invention. The first aspect of the invention may be used in combination with the second aspect of the invention, optionally without the third aspect of the invention.

In an embodiment, a width WSR1 of the first shoulder region equals a width WSR2 of the second shoulder region. The widths are shown in FIG. 2f. In an embodiment, a width WCR of the central region CR is 37% to 41% of the width W200 of the tyre 200. In an embodiment, a width WCR of the central region CR is 39% of the width W200 of the tyre 200. The specific width WCR in connection with the different sipe densities and/or land ratios of central area and shoulder area(s) have been found particularly beneficial for the properties of the tyre.

In general a sipe 240 is a much narrower opening in the tread than a groove 230. FIGS. 4c and 4d show a width W240 of a sipe. In general, a width W240 of all the sipes 240 is less than 2.0 mm. Preferably, a width W240 of all the sipes 240 is less than 1.6 mm, most preferably, less than 1.2 mm.

In contrast, a groove 230 is wider. In an embodiment, a width W230 of at least one of the grooves 230, as measured on the level of the tread 210 limiting the groove 230, is more than 4.0 mm. The width W230 is shown in FIG. 4d. Notably, the widths W230 (and lengths) of the grooves 230 define the sea portion SP shown in FIG. 3b. In FIGS. 4c and 4d, the groove 230 is arranged between a first tread block 220a and a second tread block 220b. The sipe 240 shown in these figure is arranged in the second tread block 220b. The stud 100 and the stud hole 250 in which the stud has been installed are arranged in the second tread block 220b.

The grooves may taper radially inward (i.e. in the −SR direction). Thus, in an embodiment, a width W230 of at least one of the grooves 230 decreases in an inward radial direction −SR of the tyre. Reference is made to FIG. 4d. In an embodiment, a depth D230 of at least one of the grooves 230 is more than 6.0 mm, preferably 7 mm to 15 mm.

A depth of a sipe 240 is less than a depth of a groove 230. More specifically, in an embodiment, a depth D240 of all the sipes 240 is at most equal to a depth D230 of one of the grooves 230. A bottom of a sipe needs not be even. In such a case the depth of the sipe 240 refers to a depth of the deepest point of the sipe. In an embodiment, a depth of all the sipes 240 is at least 2.0 mm.

In terms of depth, preferably an average of the depths D240 of the sipes 240 arranged in the first shoulder region SR1 of the tread 210 is not greater than an average of the depths D240 of the sipes 240 arranged in the central region CR. Likewise, preferably, an average of the depths D240 of the sipes 240 arranged in the second shoulder region SR2 of the tread 210 is not greater than an average of the depths D240 of the sipes 240 arranged in the central region CR. This has the effect that the sipes 240 provided in the shoulder region(s) SR1, SR2 do not soften the tread material too much by being too deep. This is related to handling of the tyre in the same way as the different densities of sipes detailed in connection with the third aspect of the invention.

In a preferable embodiment, at least some of the grooves 230 are inclined such that they define a V-shape or a half of a V-shape, the V-shape or the half thereof defining a direction of rotation R of the tyre 200 when used driving forward, the direction of rotation R being reverse to the direction to which the V-shape or the half thereof opens. As an example, the grooves of FIG. 2a define a half of a V-shape and a direction of rotation R as shown. In contrast the grooves of FIGS. 2c and 2f define a full V-shape and a direction of rotation R as shown. Such a tread is what is commonly known as "directional" i.e. the tyre is designed to be fitted to the vehicle wheel in one particular way. This, together with the aforementioned land ratios improves the drainage of water and slush in regular use of the tyre.

As detailed above, the tyre 200 comprises studs 100. An example of a stud 100 is shown in FIGS. 1a to 1g. The direction Sz of the figures is a longitudinal direction of the stud, and the stud may be installed to the tread 210 such that the positive longitudinal direction +Sz is the radially outward direction +SR of the tyre (see e.g. FIG. 4d). A purpose of a stud 100 is to improve grip of a tyre 200 on icy surfaces. Thus at least the pins 110 of the studs 100 are exposed on the tread 210 (see e.g. FIGS. 2e and 4d). A protrusion P100 of a stud 100 measured from the envelope surface of the tread 210 is, in an embodiment, between 0.6 mm and 2.0 mm, more preferably between 0.7 mm and 1.6 mm, and most preferably between 0.8 mm and 1.4 mm measured from an inflated tyre. The tyre is an unworn tyre. The protrusion of stud P100 is shown in FIG. 4d. In an embodiment, these values apply to an average of the protrusions P100 of the studs 100 (i.e. all the studs 100) of the tyre. In an embodiment, these values apply to all the protrusions P100 of the studs 100 (i.e. all the studs 100) of the tyre individually.

Referring to FIG. 1a, in an embodiment, a stud 100 comprises a body 120 and a pin 110. The body 120 comprises a base flange 140 and a second part 130, the second part 130 being joined to the base flange 140 and extending in the longitudinal direction Sz of the stud 100 from the base flange 140. The pin 110 protrudes from the second part 130 in the longitudinal direction Sz of the stud 100. The pin 110 comprises hard metal or ceramic. In terms of Vickers hardness, the Vickers hardness of the pin 110 is higher than the Vickers hardness of the second part 130.

The base flange 140 has a first cross-section on a plane that has a normal in the longitudinal direction Sz of the stud, the first cross-section having a first area A140. Moreover, the base flange 140 has a profile shape extending at least a certain distance in the direction of the normal of the first cross-section. As shown in FIGS. 1a and 1e, the base flange 140 has the first cross-section on the plane that has a normal in the longitudinal direction Sz of the stud. FIG. 1e shows the cross-section Ie of the base flange 140, the cross-section Ie indicated in FIG. 1a.

The pin 110 has a second cross-section on a plane that has a normal in the longitudinal direction Sz of the stud 100, the second cross-section having a second area A110. FIG. 1b shows the cross-section Ib of the pin 110, the cross-section Ib indicated in FIG. 1a. Moreover, the first area A140 is greater than the second area A110.

In the embodiment of FIGS. 1a to 1g, the second part 130 comprises a second flange 134 and a waist 132. The waist 132 connects the base flange 140 to the second flange 134. The pin 110 protrudes from the second flange 134 in the longitudinal direction Sz of the stud 100. The second flange 134 may be called an upper flange.

The waist 132 has a third cross-section on a plane that has a normal in the longitudinal direction Sz of the stud, the third cross-section having a third area A132. FIG. 1d shows the cross-section Id of the waist 132, the cross-section Id indicated in FIG. 1a.

Moreover, the second flange 134 has a fourth cross-section on a plane that has a normal in the longitudinal direction of the stud, the fourth cross-section having a fourth area A134. FIG. 1c shows the cross-section Ic of the second flange 134, the cross-section Ic indicated in FIG. 1a.

The fourth area (that of the cross-section of the second flange 134) is greater than the third area A132 (that of the cross-section of the waist 132). The fourth area (that of the cross-section of the second flange 134) is greater than the second area A110 (that of the cross-section of the pin 110).

The first area A140 (that of the cross-section of the base flange 140) is greater than a cross-section of the second part A130. A stud may comprise a second part 130 that does not comprise a waist and a second flange. In such a case the first area A140 (that of the cross-section of the base flange) is greater than the sole cross-section of the second part A130. However, the first area A140 may be greater than both of the third area A132 of the cross-section of the waist 132 and the fourth area A134 of the cross-section of the second flange 134.

To provide a good grip of the stud 100, the base flange 140 should be sufficiently large so that the dynamic impact, which the stud imposes to the road upon contact, is sufficient. Moreover, the pin 100 should be sufficiently small in order to intrude well to ice. For these reasons, preferably, a ratio A140/A110 of the first area A140 to the second area A110 is 6.5 to 21. Preferably, the ratio A140/A110 of the first area A140 to the second area A110 is 7.5 to 19, and more preferably 9 to 17.

Figure 1F:
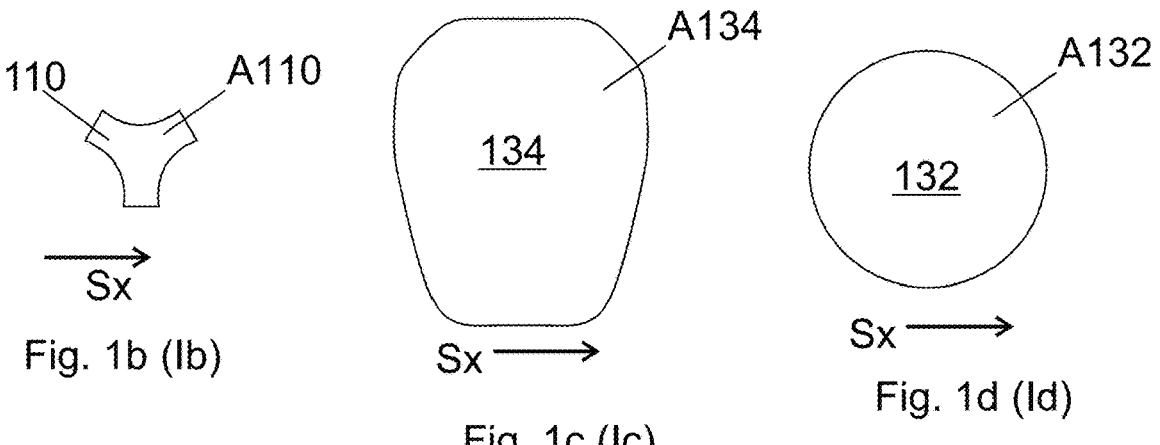
FIG. 1g shows the stud in a side view and further measures thereof.
Figure 1F:
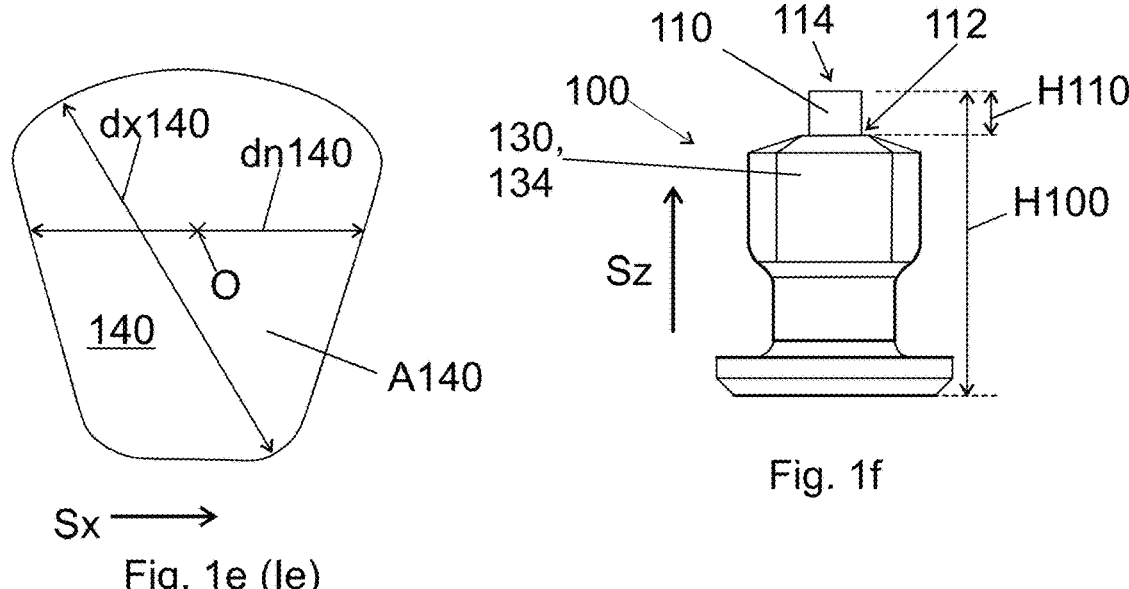

Also, to provide a good grip, the pin 110 should protrude from second part 130 (e.g. from the second flange 134) sufficiently. A first height H110, which is the first height that the pin 110 protrudes from the second flange 134 (or in the more general case, from the second part 130) is depicted in FIG. 1f. As shown in FIG. 1f, the second part 130 extends in the longitudinal direction Sz of the stud 100 from the base flange 140 to an interfacial point 112 between the second part 130 and the pin 110 and does not extend further in this direction. In FIG. 1f, the waist 132 and the second flange 134 constitute the second part 130.

The pin 110 and the second part 130 define the first height H110, which is the length the pin 110 protrudes from the interfacial point 112 in the longitudinal direction Sz to the extremal point 114 of the pin 110 in the longitudinal direction Sz of the stud.

It has been found that for good grip, the first height H110 should be selected such that a ratio A140/H110 of the first area A140 to the first height H110 is 20 to 50 mm²/mm. Preferably, the ratio A140/H110 of the first area A140 to the first height H110 is preferably 25 to 48 mm²/mm, and more preferably 28 to 45 mm²/mm. For fixing the stud firmly to stud holes, in an embodiment, the first area A140 is 20 mm² to 80 mm², preferably 30 mm² to 70 mm².

In an embodiment a mass of the stud 100 is 0.4 g to 3 g, preferably 0.5 g to 1.5 g, most preferably 0.65 g to 1.1 g. In an embodiment a mass of the pin 110 is 0.1 g to 0.8 g, preferably 0.15 g to 0.35 g. A length L110 of the pin 110 may exceed the first height H110. These measures are shown in FIG. 1g. The pin 110 may be e.g. inserted to a cavity of the second part 130 of the stud 100. A sufficient length L110 of the pin 110 ensures that the pin 110 stays fixed in its position within the second part 130. In an embodiment, a part of the pin 110 penetrates into the second part 130 of the body 120 of the stud 100, e.g. to the second flange 134 of the second part of the stud, such that the length L110 of the pin 110 is at least 150% of the first height H110. Preferably, a ratio of the length L110 of the pin 110 to the first height H110 is at least 2, more preferably at least 3. FIG. 1g shows how a part of the pin 110 penetrates into the second flange 134, which is an example of the second part 130 of the body 120 of the stud 100.

To keep the stud 100 in the stud hole 250 firmly, the first cross-section of the base flange 140 should be sufficiently large. In addition or alternatively, the stud 100 should be sufficiently long. Thus, in an embodiment, a height H100 of the stud, as measured in the longitudinal direction Sz of the stud 100 is greater than 9.5 mm. The height H100 is preferably 10.0 to 11.0 mm. Reference is made to Fig. if. Moreover (or alternatively), in an embodiment, a greatest one-dimensional measure dx140 of the first cross-section is 6.0 mm to 10.5 mm, preferably 7.0 to 10.0 mm and most preferably 7.5 mm to 8.5 mm. The measure dx140 is shown in FIG. 1e. In case the first cross-section of the base flange 140 would be circular, the greatest one-dimensional measure dx140 would be the diameter. However, typically, the first cross-section of the base flange 140 is not circular.

Moreover, in an embodiment, a length dn140 of a shortest straight line that connects an edge of the first cross-section, an opposite other edge of the first cross-section, and a central point O of the first cross-section is 4.5 mm to 9.5 mm, preferably 4.5 mm to 8.5 mm, and most preferably 5.0 to 7.5 mm. A shortest line that connects an edge of the first cross-section, an opposite other edge of the first cross-section, and a central point O of the first cross-section and the length dn140 thereof is shown in FIG. 1e. The central point O may refer to one of the following:

a centre of gravity of the first cross-section, the mass of the cross-section being uniformly distributed over the first cross-section, a normal projection of a centre of gravity of the stud 100 to the first cross-section, the normal projection being projected in the direction Sz of the length of the stud, or a normal projection of a centre of gravity of the pin 110 to the first cross-section, the normal projection being projected in the direction Sz of the length of the stud.

These measures each one separately and some or all in combination ensure that the stud 100 remains well in the stud hole 250 in use, and therefore ensure good grip of the tyre 200.

The second cross-section of the pin 110 may have various shapes. An example of the second cross-section is shown in FIG. 1b. Different examples are shown in FIGS. 5a to 5d. The second cross-section of the pin 110, the second cross-section being on a plane having normal to the direction Sz of the length of the stud, may be symmetric about one or several axes (the axis of symmetry being part of the plane of the cross-section).

Starting with forms having multiple axes of symmetry, FIG. 5d(i) shows a cross-section of the pin, the cross-section being circular. A circle is symmetric about all axes that correspond to a diameter of the circle. Thus, the cross-section of FIG. 5d(i) has infinitely many axes of symmetry. FIGS. 5d(ii) and 5d(ii) show cross-sections having six axes of symmetry. 5d(ii) shows a shape of a regular hexagon, and 5d(iii) shows a star shape with six aisles. FIG. 5d(iv) shows a square, which has four axes of symmetry. The number nS of axes of symmetry S is shown in these figures. In all FIGS. 5a to 5d the axes of symmetry S are shown by dash lines. The reference "S" is shown in FIG. 5a(i) only and indicates an axis of symmetry.

FIG. 5c (both i and ii) show second cross-sections of the tip 110, the second cross-sections have three axes of symmetry S (nS=3). FIG. 5c(i) shows a triangle and FIG. 5c(ii) shows a star shape with three aisles, each aisle provided with curved edges.

FIG. 5b (i to vi) show second cross-sections of the tip 110, the second cross-sections having two axes of symmetry S (nS=2). A basic form for some of these cross-section is a polygon with an even number of corners, optionally including rounded edges, the shape being stretched in one direction.

FIG. 5a (i to v) show second cross-sections of the tip 110, the second cross-section having only one axis of symmetry S (nS=1). A basic form for some of these cross-section is a polygon with an odd number of corners, optionally including rounded edges, the shape being stretched in one direction.

Preferable shapes of the tip 110 include such shapes that the second cross-section has one, two, or three (but not more than three) axes of symmetry. Thus, in an embodiment, the second cross-section has at least one and at most three axes such axes of symmetry S that belong to the plane of the second cross-section. Having one, two or three axes S of symmetry improves the possibilities of optimizing the grip by orienting the stud (e.g. one of the axes of symmetry) relative to the direction of rotation R. Thus, this number of axes S of symmetry is beneficial in combination with the tyre being directional (see above for definition).

The tyre comprises multiple studs. Preferably, the tyre comprises multiple such studs that have been disclosed above.

FIG. 2f shows a part of a tread 210 of a studded tyre 200. Some of the studs holes 250 are shown without the studs 100. As shown, typically the stud holes 250, before the studs 100 have been inserted into the holes 250, are small compared to the studs 100. However, because the tread blocks 220 are elastic, the stud holes 250 are stretched when installing the studs 100 to the holes 250. This further improves fixing of the studs 100 to the stud holes 250. Only some of the stud holes 250 to which studs 100, 100a, 100b have been installed are shown by reference numerals.

All the studs 100 of the tyre 200 may be identical. Thus, in an embodiment, the tyre 200 comprises studs 100 of only a first stud type.

However, the tyre 200 may comprises at least two different types of studs. As shown in FIG. 2f, an embodiment of a studded tyre 200 comprises multiple studs 100a of a first stud type and multiple studs 100b of a second stud type. In FIG. 2f, the central region CR of the tread comprises studs 100b of the second stud type, and both the first shoulder region SR1 and the second shoulder region SR2 comprise studs 100a of the first stud type. Studs 100b of the second type are not identical with the studs 100a of the first type.

In an embodiment, at least two thirds of the studs 100 that are arranged in the central region CR are of the second stud type (they are studs 100b), and at least two third of the studs arranged in the first and second shoulder regions SR1, SR2 are of the first stud type (they are studs 100a).

In an embodiment, the studs 100a of the first stud type comprise identical first pins. A cross-section of a first pin, the plane of the cross-section having a normal to the longitudinal direction Sz of the stud, has a first shape. Moreover, the studs 100b of the second stud type comprise identical second pins. A cross-section of a second pin, the plane of the cross-section having a normal to the longitudinal direction Sz of the stud, has a second shape. The second shape is different from the first shape. For example, the pin 110 of the stud 100a of the first type, as shown in FIG. 2g, has the cross-section shown in FIG. 5c(ii), and the pin 110 of the stud 100b of the first type, as shown in FIG. 2h, has the cross-section shown in FIG. 5a(iv).

By using at least two different types of studs, the grip of the tyre can be optimized. This is particularly true, when studs of the second type are used in the central region CR, and studs of the first type are used in the shoulder regions SR1, SR2.

The grip of the tyre can be improved by using sufficiently many studs. The grip of the tyre can be improved by using sufficiently many studs on both sides of the circumferential central line CL.

Concerning the former, in an embodiment, the tread 210 has the first width W210 and the first circumference C210, as defined above. Moreover, the tread 210 is provided with a total number N100 of studs 100. In an embodiment, a ratio (N100/(W210×C210)) of the total number N100 of the studs to the product W210×C210 of the first width W210 and the first circumference C210 is more than 5.6 pieces per square-decimetre (pcs/dm$^2$). The first circumference C210 may be measured along the circumferential central line CL, e.g. along a circumferential central line of the envelope surface of the tread 210.

Concerning the latter, in an embodiment, the circumferential central line CL of the tread 210 defines a first half of the tread 210 and a second half of the tread 210. In the embodiment, the first half comprises a first number N1 of studs 100, 100a, 100b and the second half comprises a second number N2 of studs 100, 100a, 100b such that a ratio (N1/N2) of the first number to the second number is 90% to 110%.

Figure 6:
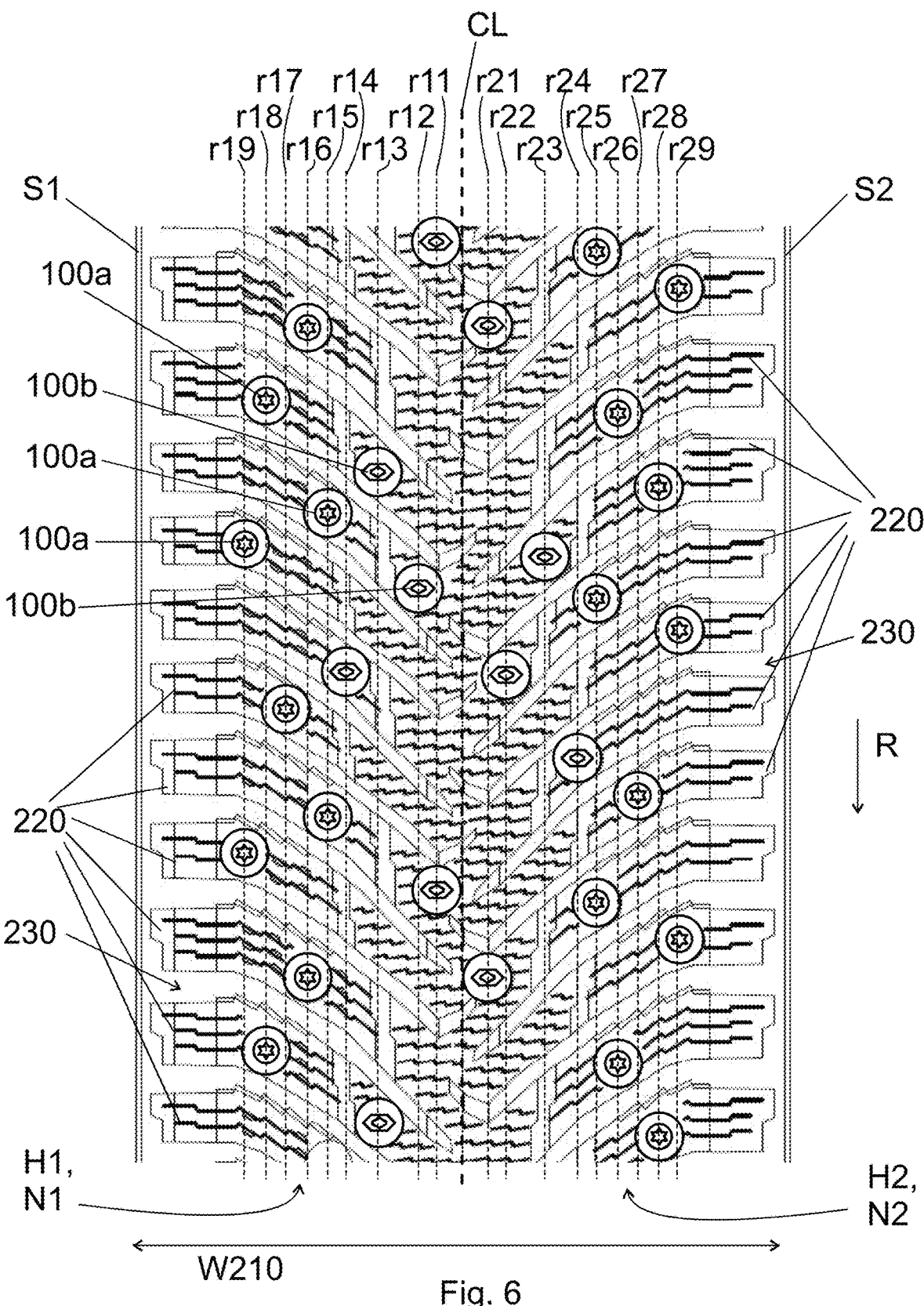
FIG. 6 shows a tread wherein studs are arranged in rows.

Referring to FIG. 6, each stud is arranged at a distance from the circumferential central line CL. Thus, each stud defines a circumferential row rij, the circumferential row being parallel to the circumferential central line CL and at such a distance that the stud is arranged on the circumferential row rij. Herein "rij" stand for j:th circumferential row in the i:th half. FIG. 6 shows nine rows (j=1, 2, . . . , 9) on both halves (i=1 or 2). Several studs may be arranged on the same circumferential row. However, preferably not all the studs of first half of the tread are arranged on the same circumferential row. This applies also for the studs of the second half of the tread. Preferably, studs are arranged on at least six different circumferential rows.

Referring to FIG. 6, in an embodiment, each one of the multiple studs 100, 100a, 100b of the tyre 200 is arranged on a circumferential row (r11, r12, r13, r14, r15, r16, r17, r18, r19, r21, r22, r23, r24, r25, r26, r27, r28, r29) such that the studs 100, 100a, 100b are arranged on at least six different circumferential rows. Different circumferential rows (r11, r12, r13, r14, r15, r16, r17, r18, r19, r21, r22, r23, r24, r25, r26, r27, r28, r29) are arranged a distance apart from each other, and multiple studs may be arranged on only one circumferential row (r11, r12, r13, r14, r15, r16, r17, r18, r19, r21, r22, r23, r24, r25, r26, r27, r28, r29).

Preferably, the circumferential central line CL of the tread 210 defines the first half of the tread 210 and the second half of the tread 210, and the studs are arranged such that at least three different circumferential rows (r11, r12, r13, r14, r15, r16, r17, r18, r19) of the at least six different circumferential rows (r11, r12, r13, r14, r15, r16, r17, r18, r19, r21, r22, r23, r24, r25, r26, r27, r28, r29) are arranged on the first half, and at least three different circumferential rows (r21, r22, r23, r24, r25, r26, r27, r28, r29) of the at least six different circumferential rows (r11, r12, r13, r14, r15, r16, r17, r18, r19, r21, r22, r23, r24, r25, r26, r27, r28, r29) are arranged on the second half.

Having such many rows rij effective spreads the studs to the tread 210 reasonably evenly, thereby improving the grip.

Preferably the tyre 200 is configured such that a road wear of the tyre is minimized. Road wear of a tyre is defined as the road wear in the test specified in the standard SFS7503:2022:en. The standard SFS7503:2022:en specifies the test procedure in detail. On the general level, a vehicle equipped with the tyres to be tested is driven over test specimens with specified speed to a specific number of times. The average wear of test specimens is expressed in units of mass (i.e. in grams). The less the tyres wear the road, the less is the result (grams) of the test. In an embodiment, the multiple studs 100, 100b, 100a and of the tyre 200 and the tread 210 of the tyre are configured such that a road wear of the tyre 200 as measured according to the standard SFS7503:2022:en is less than 1.0 g, preferably less than 0.87 g, and more preferably less than 0.79 g.

The road wear is correlated with a dynamic impact of the studs 100. The low value of road wear may be achieved e.g.

by having a sufficiently low dynamic impact of the studs to the road, particularly when driving at the speed indicated in the road wear standard. Features affecting the dynamic impact of the studs to the road include:

Mass of the stud,

Protrusion P100 of the stud,

Area of the base flange 140 (i.e. the first area A140),

Size and shape of the stud pin 110, and

The rubber material supporting the base flange 140, the material optionally being comprised by an underlayer.

Both the first area A140 and the rubber material supporting the base flange 140 have effect on how sturdy the stud is supported to the rubber material of the tyre.

In addition to the tread 210 of the tyre 200, the structure of the tyre 200 provides for sufficient rigidness of the tyre 200 and thereby also affect the handling properties of the tyre 200. The tread 210 is provided as an outermost layer of a carcass of the studded tyre 200. A quarter of a cross-section of a tyre 200 is shown in FIG. 2e. The relevant cross-section for FIG. 2e is such a cross-section that is a cross-section of the tyre 200 with a plane that comprises the axis of rotation of the tyre, which is parallel to the axial direction SAX (see FIG. 2a) and located in the centre defined by the tyre 200. Such cross-section has two parts, which are substantially identical. A half of only one of the parts is shown in FIG. 2e. An equatorial plane EP (shown in FIG. 2e) of the tyre 200 divides the tyre to two equally large parts. The circumferential central line CL defined above is arranged in the equatorial plane EP.

As detailed above, the tyre comprises the tread blocks 220 that define the grooves 230 and the tread 210, which is an outermost layer of the carcass. Preferably, the carcass of the studded tyre 200 comprises one or more layers of reinforcing textile or textiles and one of more reinforcing metal layers.

In general, a tyre 200 has side surfaces on opposite sides of the tread 210. The side surfaces connect the bead area of the tyre to the tread 210. The side surfaces may have various markings indicating the tyre size, tyre speed class, tyre purpose (winter/summer), tyre manufacturer and/or tyre name. The bead area of a tyre has a cable. The function of the cable and the bead area is to fit the tyre 200 to the rim.

The tyre 200, in particular the carcass thereof, comprises a first ply 288. The ply 288 may comprise fibrous material, e.g. Kevlar, polyamide, carbon fibres, or glass fibres.

The carcass further comprises a first metal belt 287. Preferably, the carcass further comprises a textile belt 284, such as a textile belt 284 comprising fibrous polyamide (e.g. Nylon, aramid, or Cordura). Preferably, the carcass further comprises the textile belt 284 and a second metal belt 286. The metal belt(s) 287, 286 is/are resilient metal belts, such as steel belts comprising wires.

The tread blocks 220 are comprised by a cap layer 23 of the tyre 200. The cap layer 23 may further comprise material connecting the tread blocks 220. Thus, the cap layer 23 forms at least part of a running surface of the tyre. Thus, the cap layer 23 forms at least part of an outer surface of the tread. Under the tread blocks 220 of the tread 210, i.e. under the cap layer 23, the tyre preferably comprises an underlayer 21 made of suitable rubber material. A purpose of the underlayer 21 is to support the studs 100 so that they properly contact the ground in use. Thus, in an embodiment, the studs 100 of the tyre 200 are arranged at least partly on the underlayer 21. Thus, the underlayer 21 affects the dynamic impact the studs have on the road.

Referring to FIGS. 2e, 7a and 7c, in an embodiment the tyre 200 comprises the underlayer 21. The underlayer 21 is made of a first rubber compound. Thus, in an embodiment, the tyre 200 comprises at least one ply 288, at least one metal belt 286, 287, the cap layer 23 forming at least part of a running surface of the tyre, and the underlayer 21 made of a first rubber compound.

The underlayer 21 can be a circumferential layer. The underlayer 21 can be disposed radially outside an outermost belt of the tyre, such as a textile belt 284 or a metal belt 286, 287. If the tyre comprises a textile belt 284, the underlayer 21 can be disposed radially outside the textile belt 284. Technical effect of the textile belt is to restrict expansion from centrifugal forces during driving at high speed as well as improve many properties of the tyre having the underlayer, including improved handling, grip and aquaplaning for the tyre comprising the underlayer. If the outermost belt of the tyre is a metal belt 286, 287, the underlayer 21 can be disposed radially outside the metal belt 286, 287. The underlayer 21 has an inner surface 25 and an outer surface. The outer surface of the underlayer faces the tread 20. The inner surface 25 of the underlayer substantially faces the center of the tyre 200.

By the combined effect of the underlayer 21, the ply 288, and the metal belt or belts (286, 287), the dynamic impact of the studs can be particularly well controlled at different ambient temperatures.

The underlayer 21 is preferably arranged at least partly below the studs 10. Thus, the studs 100 can be placed at least partly above the underlayer 21. Preferably, the underlayer 21 is arranged to be under each of studs of the winter tyre so that the base flange of the stud can be pressed against and retract into the underlayer 21.

The stud 100, preferably the base flange 140 of the stud, can be in direct contact with the underlayer 21. Thus, preferably, there is no other material layer between the stud and the underlayer.

Preferably, at least part of a base flange 140 of a stud is surrounded by the underlayer 21, and at least part of the second flange 134 of the stud is surrounded by the cap layer 23. Technical effect is to support the stud and decrease road wear.

More preferably, also an intermediate layer 22 is used, and at least part of a waist 132 of the stud 100 is surrounded by the intermediate layer 22. Technical effect is to improve stud retention as well as support the stud. More details of the intermediate layer 22 will follow.

The underlayer has an average thickness 21t. The average thickness 21t of the underlayer can be at least 0.5 mm, such as between 0.5 mm and 8 mm, more preferably at least 1.0 mm, and most preferably at least 1.5 mm. Furthermore, the average thickness 21t of the underlayer can be equal to or less than 7 mm, more preferably equal to or less than 6.5 mm, and most preferably equal to or less than 6 mm. The average thickness can be, for example, between 1 mm and 6 mm. Technical effect is that the ice grip properties of the stud can be substantially improved at cold weather, and moreover, the road wear at warm weather can be substantially reduced. Moreover, the underlayer of the presented thickness can be compressible to reduce road wear, to reduce tyre noise, to improve the driving performance of the tyre as well as to keep the pin of the stud protruded from the tread to provide the tyre with good grip on an icy driving surface.

In an embodiment, the underlayer has a hardness (ShA) between 45 ShA and 65 ShA, determined at an ambient temperature of 22° C. according to standard ASTM D2240. Herein (in below) the unit ShA refers to the Shore A hardness, i.e. hardness as determined in the "A" scale of the standard. Technical effect is that the underlayer 21 is able to reduce road wear at 22° C. Preferably, the underlayer has a hardness (ShA) between 45 ShA and 60 ShA, more preferably between 45 ShA and 55 ShA, determined at an ambient temperature of 22° C. according to standard ASTM D2240. These values may apply also at 23° C.

Preferably, the tyre has such an underlayer 21 that a hardness of the underlayer varies with the temperature. Technical effect is to decrease the road wear of the studded tyre but still provide desired winter grip properties in spite of the reduced road wear. Hardening/softening of the material may occur at a temperature that can be characterized by a measuring part of a complex modulus of the material as discussed below. In particular, a position of a tan delta maximum of the material may characterize a temperature at which hardening/softening takes places.

In an embodiment, a position of a tan delta maximum of the underlayer 21 is configured to be between −10° C. and +15° C., determined according to ISO 4664-1:2011 in compression. Technical effect is that in warm conditions, the underlayer can substantially soften, whereby the underlayer can allow the stud body to retract into the tread of the tyre, whereby it can reduce the stud's dynamic impact and thereby reduce the wear of the road.

The position of the tan delta maximum refers to the temperature at which tan delta reaches its maximum value. As background, the values of tan delta, as function of temperature, is referred to as a tan delta curve. The values for tan delta curve of this specification are determined as follows: Dynamic Mechanical Thermal Analysis ("DMTA") tests provide information about the small-strain mechanical response of the samples as a function of temperature. Sample specimens can be tested using a commercially available DMTA equipment in compression mode according to the standard ISO 4664-1:2011. The specimen is cooled to −60° C. and then heated to 70° C. at a rate of 2° C./min (i.e. 2 K/min) while subjected to an oscillatory deformation and a static strain, the oscillatory deformation having a frequency. Examples of specific values are detailed below. The output of the DMTA test is the storage modulus (E') and the loss modulus (E"), both as function of temperature. The storage modulus indicates the elastic response or the ability of the material to store energy, and the loss modulus indicates the viscous response or the ability of the material to dissipate energy. The ratio of E"/E', called tan delta, gives a measure of the damping ability of the material. As discussed, tan delta depends on temperature. Peaks in tan delta are associated with relaxation modes for the material, such as glass transition. The term "position of tan delta maximum" refers to a temperature in which the maximum value of a tan delta curve is obtained. Thus, "position of tan delta maximum" can be determined, for example, as a position of maximum tan delta value of the tan 5 curve.

The tan delta values can be determined from rubber compounds of a tyre as well as from rubber compounds to be used for a tyre, before forming the tyre. The sample has dimensions of diameter 4.5 mm×height 5.0 mm, when determined from a tyre. Further, the sample has dimensions of diameter 10.0 mm×height 10.0 mm, when determined from a rubber compound.

As for the values of oscillatory deformation and a static strain, for example, the following value can be used in the DMTA measurements:

an oscillatory deformation at 0.6% dynamic strain with 3.0% static strain and a frequency of 10 Hz, when using a sample having a diameter of 4.5 mm and a height of 5.0 mm, and an oscillatory deformation at 0.05% dynamic strain with 0.2% static strain and a frequency of 10 Hz, when using a sample having a diameter of 10.0 mm and a height of 10.0 mm.

The position of a tan delta maximum of the underlayer is thus the temperature at which the tan delta of the underlayer reaches it maximum. Correspondingly, the position of a tan delta maximum of the intermediate layer is the temperature at which the tan delta of the intermediate layer reaches it maximum.

From the DMTA measurements, also the dynamic stiffness (E*) of the material (underlayer of intermediate layer, whichever is tested) can be determined as detailed in the standard ISO 4664-1:2011 in a compression test. The values can be determined from rubber compounds using the procedure disclosed above for tan delta.

The dynamic stiffness of the underlayer, determined at a temperature of 20° C., can be configured to be less than 25 MPa, preferably from 5 to 20 MPa.

The dynamic stiffness (E*, MPa) of the underlayer can be lower than 25 MPa at an ambient temperature of 20° C., in the range from 25 to 500 MPa, preferably from 40 to 400 MPa, at an ambient temperature of 0° C., and at least 500 MPa at an ambient temperature of −30° C.

The change in the dynamic stiffness of the underlayer upon a decrease in the temperature can have a greater impact on the grip of the tyre in winter than the change in the hardness of the material upon a decrease in the temperature. For the above-mentioned dynamic stiffness values, the adjustment of the stud's dynamic impact of the tyre at different temperatures can be more controllable, and the grip properties of the winter tyre can be better optimized for different temperatures. Thanks to the above-mentioned dynamic stiffness, for example the braking distance on an icy road can be substantially reduced.

These properties of the underlayer 21 can be achieved by a proper composition of the material of the underlayer 21.

Preferably, the underlayer 21 contains

NR (natural rubber) from 0 to 50 phr, preferable from 10 to 40 phr, and/or BR (butadiene rubber) from 0 to 30 phr, preferable from 10 to 20 phr, and/or IR (synthetic isoprene rubber) from 0 to 50 phr, preferable from 10 to 40 phr, so that a total amount of (NR and BR and IR) is from 0 to 70 phr, SSBR (solution polymerized styrene-butadiene rubber) from 30 to 100 phr, most preferably from 40 to 70 phr, resins from 5 to 40 phr, preferably from 10 to 35 phr, and reinforcing fillers from 35 to 80 phr.

A combined amount of carbon black and/or silica (examples of reinforcing fillers) is preferably from 35 to 80 phr, more preferably from 40 to 70 phr.

Technical effect of materials comprising the rubbers comprising at least 30 phr solution polymerized styrene-butadiene rubber together with the reinforcing filler(s) and the resin(s), and preferably also 10 to 70 phr NR, BR, and/or IR, is to provide the desired tan delta curve for the rubber compound.

The underlayer 21 can further contain additives, such as one or more of oils, antidegradants, ZnO, stearic acid, vulcanization chemicals and sulphur.

As discussed, the reinforcing fillers can comprise carbon black, and/or silica.

If the reinforcing fillers comprise silica, silane can be added for improving reinforcing efficiency of the silica. Preferably, a content of the silane is equal to or less than 15% by weight, such as between 5 wt. % and 15 wt. %, determined from total weight of the silica in the underlayer.

Technical effect it to provide improved dispersion. Furthermore, silane can form bonds between silica and rubber during the vulcanization.

As discussed, the underlayer 21 preferably contains styrene butadiene rubber which is solution-polymerized styrene butadiene rubber SSBR. The underlayer 21 can comprise at least 30 phr of SSBR. Thus, the content of SSBR in the underlayer 21 can be at least 30 phr, preferably at least 35 phr, more preferably at least 40 phr, and most preferably at least 45 phr. Further, the content of SSBR in the underlayer 21 can be equal to or less than 100 phr, preferably equal to or less than 90 phr, more preferably equal to or less than 80 phr, and still more preferably equal to or less than 70 phr. By using said contents of the solution-polymerized styrene butadiene rubber SSBR, the stiffness can be efficiently adjusted as desired.

Microstructure of SSBR has an effect on properties of the SSBR. When preparing the underlayer, the vinyl content of the solution-polymerized styrene butadiene rubber, is preferably between 33% and 65% by weight, more preferably between 38% and 61% by weight, wherein the vinyl contents are expressed in mol % relative to the butadiene. Furthermore, the styrene content of the styrene butadiene rubber is preferably between 25% and 45% by weight, most preferably between 27% and 40% by weight, wherein the styrene content is expressed in mass % relative to the whole polymer. The contents can be determined by 1H-NMR method in accordance with ISO 21561-1:2015.

This embodiment can provide particularly suitable properties for the underlayer so that stiffening of the underlayer can take place in a controlled manner. Thus, stiffening can take place at a moment determined more precisely in advance.

Preferably, the underlayer contains either NR and SSBR, or BR and SSBR. In these combinations, the technical effect of NR and BR is to improve the elasticity of the underlayer even at cold temperatures. Further, the technical effect of SSBR is to improve stiffness of the mixture.

Thus, advantageously, the underlayer contains 10 to 50 phr, most preferable 10 to 40 phr of NR (natural rubber), and from 30 phr of SSBR, most preferably from 40 to 70 phr SSBR (solution polymerized styrene-butadiene rubber).

Technical effect of said combination of NR and SSBR is that the position of tan delta maximum can be efficiently adjusted as desired, and hardness of the underlayer can increase at a desired temperature, particularly when used together with the reinforcing fillers and resins according to this specification. Furthermore, thanks to this combination, elasticity of the underlayer can be maintained at cold temperatures, further improving properties of the underlayer.

It is to be noted that the natural rubber NR can be replaced with a synthetic isoprene rubber and still maintain the technical effects of the natural rubber. The synthetic isoprene rubber IR is very much like natural rubber but made synthetically. Thus, from 0 to 100 wt. % of the natural rubber NR can be replaced with the synthetic isoprene rubber IR.

In an embodiment, the underlayer advantageously contains 10 to 30 phr, most preferable 10-20 phr of polybutadiene rubber, and from 30 phr of SSBR, most preferably from 40 to 70 phr of SSBR (solution polymerized styrene-butadiene rubber).

Technical effect is that properties of the studded tyre having the underlayer can be particularly improved and position of the tan delta maximum of the underlayer can be easily adjusted by using said amounts of polybutadiene rubber and the solution polymerized styrene-butadiene rubber, particularly when used together with the reinforcing fillers and resins according to this specification.

The underlayer 21 can contain reinforcing fillers. A total amount of the reinforcing fillers is preferably more than 30 phr, more preferably at least 33 phr, still more preferably at least 35 phr, and most preferably at least 40 phr, determined from the underlayer 21. Furthermore, the underlayer 21 can comprise equal to or less than 80 phr of reinforcing fillers, preferably equal to or less than 70 phr of reinforcing fillers, still more preferably equal to or less than 60 phr of reinforcing fillers, and most preferably equal to or less than 55 phr of reinforcing fillers. Technical effect of the reinforcing fillers is that the hardness of the underlayer is easier to optimize to a desired level.

The reinforcing fillers are preferably selected from silica and carbon black. The reinforcement may comprise both silica and carbon black. If the reinforcing fillers comprises silica, also silane is preferably added to the mixture. Technical effect of the reinforcing fillers is to improve the strength of the underlayer. Furthermore, the reinforcing fillers can be used to influence the ShA hardness of the underlayer so that the hardness of the underlayer can be more easily optimized to a desired level.

In a non-limiting embodiment, the carbon black is selected from N375 and N234. These carbon blacks are known by a person skilled in the art.

In an embodiment, silica can be selected from: anhydrous silica prepared by dry process and silica prepared by wet process. Among them, hydrous silica prepared by wet process is preferable because it contains a lot of silanol groups.

In a non-limiting embodiment, the silica is selected from high BET and low BET.

Silane coupling agent can be used for silica to be appropriately dispersed during kneading. Preferably, a content of the silane is between 5 wt. % and 15 wt. %, determined from total weight of the silica in the underlayer. Technical effect it to provide improved dispersion. Furthermore, silane can form bonds between silica and rubber during the vulcanization.

The silane coupling agents can be of any type known to those skilled in the art. For example, at least one of bifunctional organosilane and polyorganosiloxane can be used. "Bifunctional" means a compound having a first functional group capable of interacting with silica, e.g., alkoxy, cycloalkoxy or phenoxy group as a leaving group on the silicon atom, and a second functional group capable of interacting with the double bond of elastomer, e.g., —SCN, —SH, —NH2 or —Sx— where x=2 to 8. The organosilanes can be chosen from the group consisting of polysulphide organosilanes (symmetrical or asymmetrical) such as bis(3-triethoxysilylpropyl) tetrasulphide, abbreviated as TESPT or bis disulphide-(triethoxysilylpropyl), abbreviated as TESPD, polyorganosiloxanes, mercaptosilanes or blocked mercaptosilanes.

The underlayer 21 can contain oil(s). The amount of oils, if used, can be at least 5 phr, more preferably at least 8 phr, and most preferably at least 10 phr. Further, the amount of oils can be equal to or less than 25 phr, preferably equal to or less than 22 phr, and most preferably equal to or less than 20 phr. Technical effect is to increase processability and adjust hardness of the compound.

The oil(s) is/are preferably selected from the group of:
vegetable oil, such as sunflower oil or rapeseed oil,
TDAE oil (treated distillate aromatic extract), MES oil (mild extracted solvate), and RAE oil (residual aromatic extract).

Preferably, said oil contains or consists of at least primarily TDAE oil and/or SRAE oil. Technical effect of oils is to act as process aids and softeners in the manufacturing process.

As discussed, the underlayer 21 can contain one or more resins. A total content of resins is preferably at least 5 phr determined from the underlayer. Technical effect is that the resins can adjust dynamic behavior of the underlayer by shifting and/or broadening the tan delta peak of the rubber compound. Thus, thanks to the resins, position of the tan delta maximum can be adjusted in a cost-efficient and controlled manner to a predetermined temperature range.

A total amount of resins can be at least 5 phr, preferably at least 10 phr, more preferably at least 15 phr, and most preferably at least 17 phr, determined from the underlayer. Further, the total amount of resins can be equal to or less than 40 phr, preferably equal to or less than 35 phr, more preferably equal to or less than 30 phr and most preferably equal to or less than 28 phr, determined from the underlayer. Thus, the total amount of resins can be, for example, 5-40 phr, preferably 10-35 phr, and more preferably 15-30 phr, determined from the underlayer. By applying resin, position of tan delta maximum of the underlayer can be raised by a predetermined level so that the hardening of the underlayer can be implemented within a predetermined temperature range. Another technical effect is that by using the preferably ranges, resins affect the rubber compound by shifting and/or broadening the tan delta peak of the rubber compound as desired.

The resin(s) used for the underlayer can have a glass transition temperature higher than 20° C., more preferably higher than 30° C., and most preferably higher than 35° C. Further, the resin(s) used for the underlayer can have a glass transition temperature of less than 110° C., preferably less than 85° C., most preferably less than 70° C. For example, the resin(s) can have a glass transition temperature from 20 to 100° C., preferably from 35 to 60° C. As discussed, Tg for resins can be determined as a peak midpoint by a differential scanning calorimeter (DSC) at a temperature rate of increase of 10° C. per minute, according to ASTM D6604 or equivalent.

Preferably, the one or more resins of the underlayer are selected from the following group:

petroleum hydrocarbon resins, aromatic vinyl-based resins, phenol-based resins, terpene resins, terpene phenol resins, rosin derived resins and copolymers, and mixtures and modifications thereof.

Technical effect is to efficiently adjust the position of tan delta maximum to a desired temperature, i.e., to shift a position of tan delta maximum to a desirable range.

Most preferably, the one or more resins of the underlayer are selected from rosin-based resins, terpene-based resins, and pure monomer C9 resins (PMR), i.e., aromatic resins based on aromatic feedstocks that have been highly purified prior to polymerization, including copolymers of styrene and a-methylstyrene. Technical effect is to shift tan delta peak position to a desirable temperature range more efficiently.

The underlayer can comprise an aromatic resin. Thus, the resin(s) can contain aromatic groups. In an embodiment, the resins contain more than 4% aromatic groups, more preferably more than 6% aromatic groups. However, the aromatic content is preferably less than 60%, more preferably equal to or less than 54%.

Advantageously, for adjusting the position of the tan delta peak of the underlayer to a desired temperature range in a controlled and precise manner, the underlayer comprises:

solution-polymerized styrene butadiene rubber SSBR, and polybutadiene rubber and/or natural rubber, and/or synthetic isoprene rubber, reinforcing filler(s), and resin(s).

The contents of the materials are preferably in the range defined in this specification.

The underlayer 21 can comprise, primarily comprise, or consist of a material whose tan delta maximum is at a temperature of at least –20° C., for example at least –15° C., preferably at least –12° C., more preferably at least –10° C., or at least –8° C., and most preferably at least –5° C. Furthermore, tan delta maximum of said material can be at a temperature equal to or less than 20° C., for example not higher than 15° C., preferably not higher than 12° C., more preferably not higher than 10° C., or not higher than 8° C., and most preferably not higher than 5° C. Thus, the hardening of the underlayer can be suitable in view of road wear and winter grip. Technical effect of the preferable ranges is that the hardening of the underlayer can take, more accurately, place at a point optimal in view of road wear and winter grip hence, the stud's dynamic impact of the tyre can be controlled easier at different temperatures.

An unvulcanized material of the underlayer can be vulcanized so that sulphur is used as the vulcanizing agent.

As indicate above, the underlayer 21 may be reasonably soft at a high temperature. However, it has been found that a too soft underlayer 21 may not result in optimal handling properties of the tyre. The inventors have found that the handling properties can be, in such a case, improved by using an intermediate layer 22 providing for sufficient rigidness, even if the underlayer 21 is soft. This applies in particular, when the underlayer 21 is made of adaptive material, i.e. material that softens at high temperatures as discussed above. Thus, in an embodiment, the tyre 200 comprises comprises the intermediate layer 22. Moreover, in such an embodiment, the underlayer 21 is arranged, at least partially, under the intermediate layer 22. The intermediate layer 22 can be a circumferential layer.

FIGS. 7b and 7d show embodiments comprising the intermediate layer 22. The intermediate layer 22 can be arranged between the cap layer 23 and the underlayer 21, at least on locations of the studs. Technical effect is that the intermediate layer improves the stability of the tyre and supports the studs 100 therein when the underlayer is softening. The intermediate layer 22 can support the studs and hence improve driving stability of the tyre on a dry road.

Even if not shown, a part of the intermediate layer 22 may form a part of the cap layer 23. Thus, in an embodiment, the intermediate layer 22, or at least part of the intermediate layer 22, is be placed between the cap layer 23 and the underlayer 21.

An average thickness 22t of the intermediate layer can be at least 0.4 mm preferably at least 0.5 mm. As for an upper limit, the thickness of the intermediate layer may be at most 7 mm. A preferable range for the thickness is at least 0.6 mm and less than 6.5 mm, more preferably at least 0.7 mm and equal to or less than 6 mm, and most preferably in a range between 0.8 mm and 5 mm. Technical effect is that the intermediate layer can, together with the underlayer, provide the stud with particularly suitable winter grip properties. Thus, the ice grip properties of the tyre can be substantially improved. In addition, properties of the vehicle tyre can be designed as desired more efficiently than in other solutions.

A thickness of the intermediate layer 22, determined at a location wherein the intermediate layer is surrounding a stud, can be at least 0.4 mm and equal to or less than 7 mm, preferably at least 0.5 mm, more preferably at least 0.6 mm and less than 6.5 mm, still more preferably at least 0.7 mm and equal to or less than 6 mm, and most preferably in a range between 0.8 mm and 5 mm. Technical effect is that the intermediate layer can support the stud. Further technical effect is that the intermediate layer can provide particularly suitable handling properties.

The intermediate layer 22 is made of a second rubber compound. In an embodiment, the intermediate layer has a hardness (ShA) between 66 ShA and 80 ShA, determined at an ambient temperature of 22° C. according to standard ASTM D2240. Technical effect is that the intermediate layer is able to improve stability of tyres having the underlayer 21. Preferably, intermediate layer has a hardness (ShA) between 70 ShA and 78 ShA, determined at an ambient temperature of 22° C. according to standard ASTM D2240. These values may apply also at the temperature 23° C.

A position of tan delta maximum of the intermediate layer 22 is, in an embodiment, configured to be between −40° C. and −70° C. (more preferably between −40° C. and −60° C.), determined according to ISO 4664-1:2011 in compression. Further, preferably, at the same time, a position of a tan delta maximum of the underlayer 21 can be configured to be between −10° C. and +15° C. (preferably between −5° C. and +15° C.), determined according to ISO 4664-1:2011 in compression. Thus, when the underlayer substantially softens in warm conditions, the intermediate layer can substantially maintain its stiffness and therefore support the stud and the whole tyre.

The dynamic stiffness of the intermediate layer, determined at a temperature of 20° C., can be configured to be at least 25 MPa, preferably at least 27 MPa, and more preferably from 30 to 100 MPa. Technical effect is to decrease road wear while the intermediate layer supports the whole tyre and the studs of the tyre at the warmer temperature. At the same time, the dynamic stiffness of the underlayer, determined at a temperature of 20° C., can be configured to be less than 25 MPa, preferably from 5 to 20 MPa.

The composition of the intermediate layer 22 affects these properties.

The intermediate layer can comprise or be made of materials selected from a group comprising or consisting of:
  elastomers, for example, SBR, BR, NR,
  fillers, for example silica and/or carbon black, wherein silane is preferably used together with the silica)
  vulcanization chemicals or curing agents, and
  one or more of resins, sulphur, oils, and antidegradants.

In an embodiment, silica may be selected from: anhydrous silica prepared by dry process and silica prepared by wet process. Among them, hydrous silica prepared by wet process is preferable because it contains a lot of silanol groups. Silane coupling agent can be used for silica to be appropriately dispersed during kneading.

If the fillers comprise silica, silane can be added for improving reinforcing efficiency of the silica. Preferably, the content of the silane is equal or less than 15% (such as from 5% to 15%) by weight relative to the amount of silica. Technical effect is to improve dispersion and during the vulcanization silane forms bond between silica and rubber.

The silane coupling agents can be of any type known to those skilled in the art. For example, at least one of bifunctional organosilane and polyorganosiloxane can be used. "Bifunctional" means a compound having a first functional group capable of interacting with silica, e.g., alkoxy, cycloalkoxy or phenoxy group as a leaving group on the silicon atom, and a second functional group capable of interacting with the double bond of elastomer, e.g., —SCN, —SH, —NH2 or —Sx— where x=2 to 8. The organosilanes can be chosen from the group consisting of polysulphide organosilanes (symmetrical or asymmetrical) such as bis(3-triethoxysilylpropyl) tetrasulphide, abbreviated as TESPT or bis disulphide-(triethoxysilylpropyl), abbreviated as TESPD, polyorganosiloxanes, mercaptosilanes or blocked mercaptosilanes.

Most preferably, the intermediate layer comprises
  SBR between 0 phr and 50 phr, such as 20 phr and 50 phr,
  BR between 0 phr and 50 phr, preferably between 10 phr and 35 phr,
  NR and/or IR between 20 phr and 100 phr, so that a total amount of (BR and NR and IR) is from 50 to 100 phr
  oils between 0 phr and 30 phr,
  resins between 0 phr and 30 phr,
  fillers between 40 phr and 80 phr, preferably the filler(s) is/are selected from carbon blacks and silicas,
  preferably, additives such as, ZnO, stearic acid, vulcanization chemicals and sulphur, and
  optionally, antidegradants.

As discussed, in an embodiment, the intermediate layer is made of an electrically conductive rubber material.

Preferably, the intermediate layer 22 comprises a rubber reinforcing carbon black. Technical effect is to increase stiffness of the intermediate layer while improving electrical conductivity through the tread. The intermediate layer can comprise a rubber reinforcing carbon black content of at least 40 phr, preferably at least 50 phr. Thus, the rubber composition(s) of the intermediate layer 22 can be relatively electrically conductive. Thus, the relatively electrically conductive rubber composition of the intermediate layer can e.g., form a part of the electrically conductive path. Thus, a very small electrical resistance can be obtained through the cap layer.

The intermediate layer 22 can comprise one or more oils. The oil(s) can comprise, for example,
  TDAE oil (treated distillate aromatic extract),
  MES oil (mild extracted solvate),
  RAE oil (residual aromatic extract), and
  vegetable oil, such as sunflower oil or rapeseed oil.

Preferably, the oil(s) are selected from TDAE and SRAE. The oils can act in the manufacturing process as process aids and softeners.

A total amount of the oils in the intermediate layer 22 can be from 0 to 30 phr.

The resin(s) of the intermediate layer can be selected from the following group:
  petroleum hydrocarbon resin,
  aromatic vinyl-based resin,
  phenol-based resin,
  terpene resin,
  terpene phenol resin,
  rosin derived resins and copolymers, and
  mixtures and modifications thereof.

A total amount of the resins in the intermediate layer 22 can be from 0 phr to 30 phr, preferably 2 to 20 phr. Technical effect of resins is fine tuning stiffness properties of the intermediate layer.

Thanks to the underlayer and the intermediate layer, properties of the tyre can be easier to control so that the underlayer can yield to a particularly suitable extent when the ambient temperature rises, which can further reduce wear of the road surface. Further, by the combined technical effect of the intermediate layer and the underlayer, wear of the road surface under non-frozen conditions can be reduced while the underlayer together with the intermediate layer substantially improves winter grip of the tyre on an icy road.

As for the relation of the hardnesses of the underlayer 21 and the intermediate layer 22, in an embodiment, hardness (ShA) of the intermediate layer is configured to be greater than hardness of the underlayer at 22° C. Said difference between the underlayer and the intermediate layer is preferably at least 10%, more preferably from 10% to 60%, and most preferably from 11% to 40% so that underlayer is at least 10% softer than the intermediate layer, determined at 22° C. Technical effect is that the underlayer yields to a suitable extent at said ambient temperature, which reduces wear of the road surface, while the harder intermediate layer supports the tyre.

In an embodiment, the first rubber compound has a first hardness (ShA) and the second rubber compound has a second hardness (ShA), and a hardness (ShA) difference between the first rubber compound and the second rubber compound is at least 15% determined at −25° C. so that the second rubber compound is at least 15% softer than the first rubber compound, determined according to standard ASTM D2240 with an exception that the hardness is determined at a temperature of −25° C. and the rubber compounds are tempered according to Table 3 of the specification. Technical effect is that the underlayer made of the first rubber compound substantially improves ice grip of the tyre on an icy road.

The hardness (ShA) difference between the underlayer and the intermediate layer at cold temperatures is preferably at least 5%, more preferably from 10% to 60%, still more preferably from 12% to 50%, and most preferably from 15% to 30% so that the underlayer is harder than the intermediate layer, determined at −25° C. Technical effect is that the underlayer and the intermediate layer substantially improves ice grip of the tyre on an icy road.

Accordingly, when measuring the Shore hardness at a temperature which is not disclosed in the standard ASTM D2240; the Shore hardness is measured by first tempering the material to be measured at the reference temperature by keeping the material to be measured at the reference temperature for a time given in Table 3 before the measurements.

and thereby reduce road wear and noise. The greater the difference in hardness of the material at different temperatures, the greater the effect of the underlayer on the grip of the tyre in cold weather and on road wear in warm weather. Thus, the effects of the underlayer can be particularly advantageous for both cold and warm conditions.

The dynamic stiffness of the underlayer, determined at a temperature of 0° C., can be configured to be at least two times the dynamic stiffness of the underlayer at a temperature of 20° C. Further, the dynamic stiffness of the intermediate layer, determined at a temperature of 0° C., can be configured to be from 1 to 1.5 times, preferably from 1.1 to 1.4 times, the dynamic stiffness of the intermediate layer at a temperature of 20° C. Technical effect is that the winter grip properties of the winter tyre can be substantially improved while the intermediate layer supports the whole tyre and the studs of the tyre at warmer temperatures.

The dynamic stiffness of the underlayer can be at least 100% higher, preferably at least 150% higher, than the dynamic stiffness of the intermediate layer at a temperature of 0° C. Technical effect is that the ice grip properties of the winter tyre can be substantially improved at 0° C. The dynamic stiffness of the underlayer may further be equal to or less than 1000% higher, such as equal to or less than 900% higher, preferably equal to or less than 580% higher than the dynamic stiffness of the intermediate layer at a temperature of 0° C.

Furthermore, the dynamic stiffness of the intermediate layer can be higher than the dynamic stiffness of the underlayer at a temperature of at least 5° C., such as at a temperature of at least 7° C. In a particularly advantageous embodiments, the dynamic stiffness of the intermediate layer is higher than the dynamic stiffness of the underlayer at temperatures from 10° C. to 20° C. Technical effect is to reduce road wear while improving handling properties of the tyre. Further technical effect is that the intermediate layer effectively supports the stud.

The dynamic stiffness of the underlayer at −25° C. can be at least 20 times the dynamic stiffness of the underlayer at +20° C. Thus, the grip properties of the winter tyre can be substantially improved, and, for example, the braking distance needed by the winter tyre under certain conditions can be substantially reduced.

It was noted during experimental tests that properties of tyres were particularly improved when the position of tan delta maximum of the underlayer was in a range between 0° C. and 10° C., and the position of tan delta maximum of the intermediate layer was less than −30° C. Thus, preferably, the tan delta peak position of the underlayer is in a range

TABLE 3

Tempering of a sample before hardness measurement.

| Sample Thickness (mm) | Temperature (° C.) | | | | | | | | | | |
|---|---|---|---|---|---|---|---|---|---|---|---|
| | −50 to less than −40 | −40 to less than −25 | −25 to less than −10 | −10 to less than −5 | −5 to less than 0 | 0 to less than 5 | 5 to less than 10 | 10 to less than 25 | 25 to less than 40 | 40 to less than 60 | 60 |
| | Time (min) to balance | | | | | | | | | | |
| 10 | 45 | 45 | 40 | 35 | 35 | 30 | 35 | 35 | 35 | 35 | 45 |
| 8 | 35 | 35 | 30 | 30 | 30 | 25 | 30 | 30 | 30 | 30 | 35 |
| 5 | 20 | 20 | 20 | 20 | 20 | 15 | 20 | 20 | 20 | 20 | 20 |
| 3 | 15 | 15 | 15 | 15 | 15 | 10 | 10 | 10 | 10 | 10 | 10 |
| 2 | 10 | 10 | 10 | 10 | 10 | 10 | 10 | 10 | 10 | 10 | 10 |

65

A softer underlayer material can substantially increase the retraction of the stud into the tyre at warmer temperatures between 0° C. and 10° C., and the tan delta peak position of the intermediate layer is equal to or less than −30° C.

In a preferred example, for optimizing the grip properties of the tyre in winter, (A) the hardness (ShA) of the underlayer can be lower than 60 ShA and preferably lower than 55 ShA at 20° C., and preferably at least 60 ShA, more preferably at least 65 ShA, at 0° C., and higher than 75 ShA at −30° C.;

and furthermore, (B) the dynamic stiffness of the underlayer can be lower than 25 MPa at an ambient temperature of 20° C., between 25 and 500 MPa at an ambient temperature of 0° C., and at least 500 MPa at an ambient temperature of −30° C.

During the experimental tests, it was noted that properties of tyres were particularly improved when a cross point of stiffness curves of the underlayer and the intermediate layer (shown in FIG. 6b) was in a range between +5° C. and 20° C., and particularly when the cross point of stiffness curves was in a range between +7° C. and 13° C.

Thus, advantageously, a cross point of stiffness curves of the underlayer and the intermediate layer is in a range between +5° C. and 20° C., more preferably in a range between +7° C. and 13° C.

In an advantageous embodiment, the dynamic stiffness of the underlayer is higher than the dynamic stiffness of the intermediate layer at temperatures of less than 5° C., but the dynamic stiffness of the intermediate layer is higher than the dynamic stiffness of the underlayer at temperatures from 15° C. to 20° C. Technical effect is to substantially reduce road wear while improving handling properties of the tyre.

Experimental

As for the materials of the underlayer 21 and the intermediate layer 22, several studded tyres comprising the underlayer and the intermediate layer according to this specification were manufactured. The amounts of raw materials were as disclosed in the specification.

Table 4 discloses, as an example, raw materials of the underlayer and the intermediate layer for one of the manufactured tyres.

TABLE 4

| Raw materials | Underlayer (phr) | Intermediate layer (phr) |
|---|---|---|
| SSBR (58% vinyl, 34% styrene) | 50 | — |
| ESBR (16% vinyl, 23% styrene) | — | 40 |
| NR | 30 | 40 |
| BR | 20 | 20 |
| Oil (TDAE) | 20 | 9 |
| Resin, Tg 39° C. | 30 | — |
| Carbon black, N375 | 40 | 60 |
| Zinc oxide (ZnO) | 3 | 3 |
| Stearic acid | 2 | 1 |
| 6PPD (N-(1,3-Dimethylbutyl)-N'-phenyl-p-phenylenediamine) | 1 | 1 |
| TMQ (2,2,4-Trimethyl-1,2-dihydroquinoline) | 1 | 1 |
| Sulphur | 1.40 | 1 |
| CBS (N-Cyclohexyl-2-benzothiazole sulfenamide) | 1.40 | 2.90 |
| ZBEC (Zinc bis(dibenzyldithiocarbamate)) | 0.25 | — |

The rubber mixtures were obtained by means of a stepwise mixing process. A 2 L-internal mixer (Krupp Elastomertechnik GK 1,5 laboratory mixer) was used to add the compounds.

In the first step, the polymers were added and mixed for 40 seconds. In the second step, part of the carbon black and chemicals were added and mixed for 60 seconds. In the third step, the rest of the carbon black and oil were added and mixed for 90 seconds or temperature in mixing chamber received 150 degrees.

The final step with curing chemicals was performed at 95° C. for 50 seconds.

DMTA samples were vulcanized at 150° C. by using a pressure of 150 bar. The optimum vulcanization time of t90 (at 150° C.) was determined with a moving die rheometer according to ISO 4664-1:2011. A vulcanization time of t90 plus 5 min was used for the samples.

Position of tan delta max, DMTA at 20° C. and at −20° C., and hardness (ShA) at 20° C. were determined from the obtained underlayer and intermediate compounds.

DMTA measurements results of Table 5 were done by using tension mode according to standard ISO 4664-1:2011, by using a temperature range from −60° C. to 70° C., 10 Hz, static strain 3%, and dynamic strain ±0,2%.

TABLE 5

| DMTA measurements | | |
|---|---|---|
| Properties | Underlayer | Intermediate layer |
| Position of Tan δ maximum (Temperature (° C.)) | 3 | −47 |
| E* (20° C.) (MPa) | 6 | 17 |
| E* (−20° C.) (MPa) | 411 | 34 |
| E*(−25° C.) (MPa) | 566 | 41 |
| Hardness (22° C.) (ShA) | 48 | 68 |

As can be seen from Table 5, the underlayer as well as the intermediate layer had the desired properties for being able to reduce road wear while improving stability of tyres.

Numbered Examples Concerning the Tyre

101. A tyre (200) comprising a tread (210) comprising tread blocks (220) such that grooves (230) are arranged between the tread blocks (220) and studs (100, 100a, 100b) installed into at least some of the tread blocks (220), wherein the tread blocks (220) define a land portion of the tread (210), the land portion consisting of the parts of the tread blocks (220) and the studs (100, 100a, 100b) arranged to contact a surface in use of the tyre (200), the land portion having a total land area (A220), and an envelope surface consisting of the land portion of the tread (210) and the regions defined by the openings of the grooves (230), the envelope surface having a total envelope area (A210), an average land ratio of the tyre (200), the average land ratio being defined as a ratio (A220/A210) of the total land area (A220) to total envelope area (A210), is 55% to 78%.

102. A tyre (200) comprising a tread (210) comprising tread blocks (220) such that grooves (230) are arranged between the tread blocks (220) and studs (100, 100a, 100b) installed into at least some of the tread blocks (220), wherein a central region (CR) of the tread (210) is arranged between a first shoulder region (SR1) of the tread (210)

and a second shoulder region (SR2) of the tread (210), the central region (CR) comprising a circumferential central line (CL) of the tread (210), the tread blocks (220) define a land portion of the tread (210), the land portion consisting of the parts of the tread blocks (220) and the studs (100, 100a, 100b) arranged to contact a surface in use of the tyre (200), the land portion having a total land area (A220), and an envelope surface consisting of the land portion of the tread (210) and the regions defined by the openings of the grooves (230), the envelope surface having a total envelope area (A210), the land portion of the tread (210) has a central land area being the area of the part of the land portion of the tread (210) that belongs to the central region (CR), a first shoulder land area being the area of the part of the land portion of the tread (210) that belongs to the first shoulder region (SR1), and a second shoulder land area being the area of the part of the land portion of the tread (210) that belongs to the second shoulder region (SR2), and the envelope surface has a central envelope area being the area of the part of the envelope surface that belongs to the central region (CR), a first shoulder envelope area being the area of the part of the envelope surface that belongs to the first shoulder region (SR1), and a second shoulder envelope area being the area of the part of the envelope surface that belongs to the second shoulder region (SR2), wherein a central land ratio of the tyre (200), the central land ratio being defined as a ratio of the central land area to the central envelope area is 1 to 30 percentage points greater than either or both of a first shoulder land ratio of the tyre (200), the first shoulder land ratio being defined as a ratio of the first shoulder land area to the first shoulder envelope area and a second shoulder land ratio of the tyre (200), the second shoulder land ratio being defined as a ratio of the second shoulder land area to the second shoulder envelope area.

103. The tyre of example 102, wherein a total land area (A220) of the tread (210) is the area of the land portion of the tread (210)

a total envelope area (A210) of the tread (210) is the area of the envelope surface, and an average land ratio of the tyre (200), the average land ratio being defined as a ratio (A220/A210) of the total land area (A220) to the total envelope area (A210) is 55% to 78%.

104. The tyre of any of the examples 101 to 103, wherein at least some of the tread blocks (220) are provided with sipes (240).

105. A tyre (200), comprising a tread (210) comprising tread blocks (220) such that grooves (230) are arranged between the tread blocks (220) and studs (100, 100a, 100b) installed into at least some of the tread blocks (220), wherein a central region (CR) of the tread (210) is arranged between a first shoulder region (SR1) of the tread (210) and a second shoulder region (SR2) of the tread (210), the central region (CR) comprising a circumferential central line (CL) of the tread (210), at least some of the tread blocks (220) of the central region (CR) are provided with sipes (240), such that the tyre (200) has a first density of sipes (240), the first density of sipes (240) being defined as a total length of the sipes (240) arranged in the central region (CR) divided by the area of the central region (CR), at least some of the tread blocks (220) of the first shoulder region (SR1) are provided with sipes (240), such that the tyre (200) has a second density of sipes (240), the second density of sipes (240) being defined as a total length of the sipes (240) arranged in the first shoulder region (SR1) divided by the area of the first shoulder region (SR1), at least some of the tread blocks (220) of the second shoulder region (SR2) are provided with sipes (240), such that the tyre (200) has a third density of sipes (240), the third density of sipes (240) being defined as a total length of the sipes (240) arranged in the second shoulder region (SR2) divided by the area of the second shoulder region (SR2), the first density of sipes (240) is at least 15% greater than either or both of the second density of sipes (240) and the third density of sipes (240).

106. The tyre (200) of example 105, wherein the tread blocks (220) define a land portion of the tread (210), the land portion consisting of the parts of the tread blocks (220) and the studs (100, 100a, 100b) arranged to contact a surface in use of the tyre (200), the land portion having a total land area (A220), and an envelope surface consisting of the land portion of the tread (210) and the regions defined by the openings of the grooves (230), the envelope surface having a total envelope area (A210), an average land ratio of the tyre (200), the average land ratio being defined as a ratio (A220/A210) of the total land area (A220) to total envelope area (A210), is 55% to 78%.

107. The tyre of the example 102 or 103, wherein at least some of the tread blocks (220) of the central region (CR) are provided with sipes (240), such that the tyre (200) has a first density of sipes (240), the first density of sipes (240) being defined as a total length of the sipes (240) arranged in the central region (CR) divided by the area of the central region (CR), at least some of the tread blocks (220) of the first shoulder region (SR1) are provided with sipes (240), such that the tyre (200) has a second density of sipes (240), the second density of sipes (240) being defined as a total length of the sipes (240) arranged in the first shoulder region (SR1) divided by the area of the first shoulder region (SR1), at least some of the tread blocks (220) of the second shoulder region (SR2) are provided with sipes (240), such that the tyre (200) has a third density of sipes (240), the third density of sipes (240) being defined as a total length of the sipes (240) arranged in the second shoulder region (SR2) divided by the area of the second shoulder region (SR2), the first density of sipes (240) is at least 15% greater than either or both of the second density of sipes (240) and the third density of sipes (240).

108. The tyre of any of the examples 104 to 107, wherein
at least a part of one of the studs (100, 100*a*, 100*b***) is
arranged in a stud hole (250) provided in one of the
tread blocks (220) and
no part of any of the sipes (240) is arranged closer than 6
mm to a centre of the stud hole (250).

109. The tyre of any of the example 108, wherein
a part of at least one of the sipes (240) is arranged closer
than 12 mm to a centre of the stud hole (250).

110. The tyre (200) of any of the examples 101 to 109,
wherein
the tread comprises or is formed of rubber material having
a Shore hardness in the range 48 to 59 Sh(A) as
measured with durometer type A, at the temperature
23° C.

111. The tyre (200) of any of the examples 101 to 110,
wherein
the tyre (200) has a width (W200) that is 150 mm to 350
mm and/or.
the tread (210) has a first width (W210) that is 150 mm to
350 mm.

112. The tyre (200) of any of the examples 101 to 111,
wherein
a width (WSR1) of the first shoulder region equals a width
(WSR2) of the second shoulder region.

113. The tyre (200) of any of the examples 101 to 112,
wherein
a width (WCR) of the central region (CR) is 37% to 41%
of a width (W200) of the tyre (200);
preferably
a width (WCR) of the central region (CR) is 39% of a
width (W200) of the tyre (200).

114. The tyre (200) of any of the examples 101 to 113,
wherein
the average land ratio of the tyre (200) is 61% to 75%,
preferably 65% to 72%, such as about 67%.

115. The tyre (200) of any of the examples 104 to 114,
wherein
no part of any of the sipes (240) is arranged closer than 10
mm to a centre of the stud hole (250).

116. The tyre (200) of any of the examples 104 to 115,
wherein
at least a parts of multiple studs (100, 100*a*, 100*b***) are
arranged in multiple stud holes (250) provided in
multiple tread blocks (220), and
no part of any of the sipes (240) is arranged closer than 6
mm to a centre of any one of the stud holes (250);
preferably
no part of any of the sipes (240) is arranged closer than 8
mm to a centre of any one of the stud holes (250).

117. The tyre (200) of any of the examples 104 to 115,
wherein
the tyre comprises multiple such sipes that a part each one
of the multiple sipes (240) is arranged closer than 12
mm to a centre a stud hole (250) to which a stud (100)
has been arranged; preferably
the tyre comprises multiple such sipes that a part each one
of the multiple sipes (240) is arranged closer than 10
mm to a centre a stud hole (250) to which a stud has
been arranged.
Parts of different sipes may be close to different stud
holes.

118. The tyre (200) of any of the examples 104 to 117,
wherein
a width (W240) of all the sipes (240) is less than 2.0 mm;

preferably
the width (W240) of all the sipes (240) is less than 1.6
mm;
more preferably,
the width (W240) of all the sipes (240) is less than 1.2
mm.

119. The tyre (200) of any of the examples 104 to 118,
wherein
a depth of all the sipes (240) is at least 2.0 mm.

120. The tyre (200) of any of the examples 104 to 119,
wherein
a depth (D240) of all the sipes (240) is at most equal to
a depth (D230) of one of the grooves (230).

121. The tyre (200) of any of the examples 104 to 120,
wherein
an average of the depths (D240) of the sipes (240)
arranged in the first shoulder region (SR1) of the tread
(210) is not greater than an average of the depths
(D240) of the sipes (240) arranged in the central region
(CR).

122. The tyre (200) of any of the examples 104 to 121,
wherein
an average of the depths (D240) of the sipes (240)
arranged in the second shoulder region (SR2) of the
tread (210) is not greater than an average of the depths
(D240) of the sipes (240) arranged in the central region
(CR).

123. The tyre (200) of any of the examples 101 to 122,
wherein the tyre (200) has been manufactured by
vulcanizing a green tyre to form the tyre (200) and
forming stud holes (250) to the tread (210) of the tyre
(200) during the vulcanizing the green tyre.

124. The tyre (200) of any of the examples 101 to 123,
wherein
the tyre (200) has been manufactured by
vulcanizing a green tyre to form the tyre (200) and
forming sipes (240) or the sipes (240) to the tread (210)
of the tyre (200) during the vulcanizing the green tyre
by using lamella blades.

125. The tyre (200) of any of the examples 101 to 124,
wherein
a depth (D230) of at least one of the grooves (230) is more
than 6.0 mm, preferably 7 mm to 15 mm.

126. The tyre (200) of any of the examples 101 to 125,
wherein
a width (W230) of at least one of the grooves (230), as
measured on the level of the tread (210) limiting the
groove (230), is more than 4.0 mm.

127. The tyre (200) of any of the examples 101 to 126,
wherein
a width (W230) of at least one of the grooves (230)
decreases in an inward radial direction (−SR) of the
tyre.

128. The tyre (200) of the any of the examples 101 to 127,
wherein
at least some of the grooves (230) are inclined such that
they define a V-shape or a half of a V-shape, the
V-shape or the half thereof defining a direction of
rotation (R) of the tyre (200) when used driving for-
wards, the direction of rotation (R) being reverse to the
direction to which the V-shape or the half thereof
opens.

129. The tyre of any of the examples 101 to 129, wherein
each one of the studs (100, 100*a*, 100*b***) comprise a pin
(110), wherein
at least the pins (110) of the studs (100, 100*a*, 100*b***) are
exposed on the tread (210).

130. The tyre of any of the examples 101 to 129, wherein an average of a protrusions (P100) of studs (100) measured from an/the envelope surface of the tread (210) is between 0.6 mm and 2.0 mm, preferably between 0.7 mm and 1.6 mm, and most preferably between 0.8 mm and 1.4 mm.

131. The tyre of any of the examples 101 to 130, wherein protrusions (P100) of all the studs measured from an/the envelope surface of the tread (210) are between 0.6 mm and 2.0 mm, preferably between 0.7 mm and 1.6 mm, and most preferably between 0.8 mm and 1.4 mm.

132. The tyre of any of the example 130, wherein the studs (100, 100*a*, 100*b*) comprise multiple studs according to at least one of the examples 201 to 216.

133. The tyre (200) of the example 101 or 132, wherein the tyre (200) comprises only studs of a first stud type.

134. The tyre (200) of the example 101 or 132, wherein the tyre (200) comprises multiple studs (100*a*) of a first stud type and multiple studs (100*b*) of a second stud type.

135. The tyre (200) of the example 134, wherein a/the central region (CR) of the tread (210) is arranged between a/the first shoulder region (SR1) of the tread (210) and a/the second shoulder region (SR2) of the tread (210), the central region (CR) comprises studs (100*b*) of the second stud type, the first shoulder region (SR1) and/or the second shoulder region (SR2) comprises studs (100*a*) of the first stud type.

136. The tyre (200) of the example 135, wherein at least two thirds (⅔) of the studs (100, 100*a*, 100*b*) that are arranged in the central region (CR) are of the second stud type, at least two thirds (⅔) of the studs arranged in the first shoulder region (SR1) are of the first stud type, and at least two thirds (⅔) of the studs arranged in the second shoulder region (SR2) are of the first stud type.

137. The tyre (200) of any of the examples 134 to 136, wherein the studs (100*a*) of the first stud type comprise identical first pins, a cross-section of a first pin having a first shape, and the studs (100*b*) of the second stud type comprise identical second pins, a cross-section of a second pin having a second shape that is different from the first shape.

138. The tyre (200) of any of the examples 101 to 137, wherein a/the circumferential central line (CL) of the tread (210) defines a first half (H1) of the tread (210) and a second half (H2) of the tread (210), wherein the first half comprises a first number (N1) of studs (100, 100*a*, 100*b*) and the second half comprises a second number (N2) of studs (100, 100*a*, 100*b*) such that a ratio (N1/N2) of the first number to the second number is 90% to 110%.

139. The tyre (200) of any of the examples 101 to 138, wherein the tread (210) has a first width (W210) and a first circumference (C210), the tread (210) is provided with a total number (N100) of studs (100), and a ratio (N100/(W210×C210)) of the total number (N100) of the studs to the product of the first width (W210) and the first circumference (C210) is more than 5.6 pieces per square-decimetre.

140. The tyre (200) of any of the examples 101 to 139, wherein each one of the multiple studs (100, 100*a*, 100*b*) is arranged on a circumferential row (r11, r12, r13, r14, r15, r16, r17, r18, r19, r21, r22, r23, r24, r25, r26, r27, r28, r29) such that the studs are arranged on at least six different circumferential rows, wherein different circumferential rows (r11, r12, r13, r14, r15, r16, r17, r18, r19, r21, r22, r23, r24, r25, r26, r27, r28, r29) are arranged a distance apart from each other. Multiple studs may be arranged on only one circumferential row (r11, r12, r13, r14, r15, r16, r17, r18, r19, r21, r22, r23, r24, r25, r26, r27, r28, r29).

141. The tyre (200) of the example 140, wherein a/the circumferential central line (CL) of the tread (210) defines a/the first half of the tread (210) and a/the second half of the tread (210), at least three different circumferential rows (r11, r12, r13, r14, r15, r16, r17, r18, r19) of the at least six different circumferential rows (r11, r12, r13, r14, r15, r16, r17, r18, r19, r21, r22, r23, r24, r25, r26, r27, r28, r29) are arranged on the first half, and at least three different circumferential rows (r21, r22, r23, r24, r25, r26, r27, r28, r29) of the at least six different circumferential rows (r11, r12, r13, r14, r15, r16, r17, r18, r19, r21, r22, r23, r24, r25, r26, r27, r28, r29) are arranged on the second half.

142. The tyre (200) of any of the examples 101 to 141, wherein the studs (100, 100*b*, 100*a*) and the tread (210) are configured such that a road wear of the tyre (200) as measured according to the standard SFS7503:2022:en is less than 1.0 g, preferably less than 0.87 g, and more preferably less than 0.79 g.

143. The tyre (200) of any of the examples 102 to 142, wherein the circumferential central line (CL) of the tread 210 divides the central region (CR) to two equally wide parts.

144. The tyre (200) of any of the examples 102 to 143, wherein the first shoulder region (SR1), the second shoulder region (SR2) and the central region (CR) constitute the tread (210).

145. The tyre of any of the examples 101 to 144, comprising
at least one ply (288),
at least one metal belt (286, 287),
a cap layer (23) forming at least part of a running surface of the tyre, and
an underlayer (21) made of a first rubber compound.

146. The tyre of the example 145 comprising
at least one textile belt (284).

147. The tyre of the example 145 or 146, wherein
a position of a tan delta maximum of the underlayer (21) and/or the first rubber compound is configured to be between −10° C. and +15° C., determined according to ISO 4664-1:2011 in compression.

148. The tyre of any of the examples 145 to 147, wherein an average thickness of the underlayer (21) is at least 0.5 mm and not greater than 8 mm.

149. The tyre of the example 148, wherein the average thickness of the underlayer (21) is 1 mm to 7 mm, preferably 1 mm to 6.5 mm, more preferably 1.5 mm to 6.0 mm.

150. The tyre of any of the examples 145 to 149, wherein each stud (100) of the tyre (200) comprises a base flange (140), a waist (132), and a second flange (134), at least part of the base flange (140) is surrounded by the underlayer (21), and at least part of the second flange (134) is surrounded by the cap layer (23).

151. The tyre of any of the examples 145 to 150, wherein a dynamic stiffness (E*, MPa) of the underlayer (21) is configured to be less than 25 MPa, preferably from 5 to 20 MPa, determined at 20° C., and the dynamic stiffness (E*, MPa) of the underlayer (21), determined at 0° C., is configured to be at least 2 times the dynamic stiffness of the underlayer determined at 20° C., the dynamic stiffnesses determined according to ISO 4664-1:2011 in compression.

152. The tyre of any of the examples 145 to 151, wherein a/the dynamic stiffness (E*, MPa) of the underlayer (21) is configured to be less than 25 MPa, preferably from 5 to 20 MPa, determined at 20° C., and the dynamic stiffness (E*, MPa) of the underlayer (21) determined at −25° C., is configured to be at least 20 times the dynamic stiffness of the underlayer determined at +20° C., the dynamic stiffnesses determined according to the standard ISO 4664-1:2011 in compression.

153. The tyre of any of the examples 145 to 152, wherein the underlayer (21) comprises natural rubber (NR) from 0 to 70 phr, and/or butadiene rubber (BR) from 0 to 30 phr, and/or synthetic isoprene rubber (IR) from 0 to 70 phr, so that a total amount of (natural rubber, butadiene rubber and synthetic isoprene rubber) is from 0 to 70 phr, preferably from 30 to 60 phr, solution polymerized styrene-butadiene rubber (SSBR) from 30 to 100 phr, preferably from 40 to 70 phr, one or more reinforcing fillers from 35 to 80 phr, and one or more resins from 5 to 40 phr.

154. The tyre of any of the examples 145 to 153, wherein the underlayer (21) comprises a/the solution-polymerized styrene butadiene rubber (SSBR), wherein the solution-polymerized styrene butadiene rubber has, when preparing the underlayer, a vinyl content in a range between 33% and 65%, preferably in a range between 38% and 61%, wherein the vinyl contents are determined in mol % relative to the butadiene, and a styrene content between 25% and 45%, preferably between 27% and 40%, wherein the styrene contents are determined in mass % relative to the whole polymer determined according to ISO 21561-1:2015.

155. The tyre of any of the examples 145 to 154, wherein the underlayer contains a total amount of 10 to 50 phr, preferable 10 to 40 phr of natural rubber and/or synthetic isoprene rubber, and optionally, 10 to 30 phr, preferable 10-20 phr of polybutadiene rubber.

156. The tyre of any of the examples 153 to 155, wherein the underlayer comprises one or more reinforcing fillers selected from carbon blacks, and silicas, wherein a total amount of said reinforcing fillers is from 35 to 80 phr, more preferably from 40 to 70 phr.

157. The tyre of any of the examples 145 to 156, wherein the first rubber compound has a first hardness (ShA) between 45 ShA and 65 ShA, determined at an ambient temperature of 23° C. according to standard ASTM D2240.

The unit ShA denotes the Shore hardness using the "A" scale.

158. The tyre of any the examples 145 to 157 comprising an intermediate layer (22) made of a second rubber compound, the intermediate layer (22) being arranged, at least partially, between the underlayer (21) and the cap layer (23).

159. The tyre of the example 158, wherein a position of a tan delta maximum of the intermediate layer (22) and/or the second rubber compound is configured to be between −40° C. and −70° C., such as between −40° C. and −60° C., determined according to ISO 4664-1:2011 in compression.

160. The tyre of the example 158 or 159, wherein an average thickness of the intermediate layer (22) is at least 0.4 mm and not greater than 7 mm.

161. The tyre of any of the examples 158 to 160, wherein each stud (100) of the tyre (200) comprises a base flange (140), a waist (132), and a second flange (134), at least part of the waist (132) is surrounded by the intermediate layer (22); for example, parts of the intermediate layer (22) laterally surround at least some of the waists (132) of the studs (100).

162. The tyre of any of the examples 158 to 161, wherein a thickness of the intermediate layer (22), determined at a location wherein the intermediate layer is surrounding a stud, is at least 0.4 mm, preferably at least 0.5 mm.

163. The tyre of any of the examples 158 to 162, wherein a dynamic stiffness of the intermediate layer (22) is configured to be from 25 to 100 MPa, determined at 20° C., and the dynamic stiffness of the intermediate layer (22), determined at 0° C., is configured to be from 1 to 1.5 times the dynamic stiffness of the intermediate layer determined at 20° C., the dynamic stiffnesses determined according to the standard ISO 4664-1:2011 in compression.

164. The tyre of any of the examples 158 to 163, wherein the second rubber compound has a second hardness (ShA) between 66 ShA and 80 ShA, determined at an ambient temperature of 23° C. according to standard ASTM D2240.

The unit ShA denotes the Shore hardness using the "A" scale.

165. The tyre of any of the examples 158 to 164, wherein the first rubber compound has a/the first hardness (ShA) and the second rubber compound has a/the second hardness (ShA), and a hardness (ShA) difference between the first rubber compound and the second rubber compound is at least 10% determined at −25° C. so that the second rubber compound is at least 10% softer than the first rubber compound, determined according to standard ASTM D2240 with an exception that the temperature is −25° C. and the rubber compounds are tempered according to Table 3 of the specification.

Examples Concerning the Studs as Such

201. A stud (100) for improving grip of a tyre (200), the stud (100) comprising a body (120) comprising a base flange (140) and a second part (130), the second part (130) being joined to the base flange (140) and extending in a longitudinal direction (Sz) of the stud (100) from the base flange (140), and a pin (110) protruding from the second part (130) in the longitudinal direction (Sz) of the stud (100), wherein the pin (110) comprises hard metal or ceramic, the base flange (140) has a first cross-section on a plane that has a normal in the longitudinal direction of the stud, the first cross-section having a first area (A140), the pin (110) has a second cross-section on a plane that has a normal in the longitudinal direction (Sz) of the stud (100), the second cross-section having a second area (A110), and the first area (A140) is greater than the second area (A110).

202. The stud of the example 201, the second part (130) has a third cross-section on a plane that has a normal in the longitudinal direction of the stud, the third cross-section having a third area (A130, A132), the first area (A140) is greater than the third area (A130, A132), and the third area (A130, A132) is greater than the second area (A110).

203. The stud of the example 201 or 202, wherein the second part (130) comprises a second flange (134) and a waist (132), the waist (132) connecting the base flange (140) to the second flange (134) and the pin (110) protrudes from the second flange (134) in the longitudinal direction (Sz) of the stud (100).

204. The stud of the example 203, wherein the waist (132) has a/the third cross-section on a plane that has a normal in the longitudinal direction of the stud, the third cross-section having a/the third area (A132), the second flange (134) has a fourth cross-section on a plane that has a normal in the longitudinal direction of the stud, the fourth cross-section having a fourth area (A134), the fourth area (A134) is greater than the third area (A132), and the fourth area (A134) is greater than the second area (A110).

205. The stud of any of the examples 201 to 204, wherein a ratio (A140/A110) of the first area (A140) to the second area (A110) is 6.5 to 21, preferably 7.5 to 19, and more preferably 9 to 17.

206. The stud of any of the examples 201 to 205, wherein the pin (110) protrudes a first height (H110) from the second part (130) in the longitudinal direction (Sz), wherein a ratio (A140/H110) of the first area (A140) to the first height (H110) is 20 to 50 mm²/mm, preferably 25 to 48 mm²/mm, and more preferably 28 to 45 mm²/mm.

207. The stud of any of the examples 201 to 206, wherein the second part (130) extends in the longitudinal direction (Sz) of the stud (100) from the base flange (140) to an interfacial point (112) between the second part (130) and the pin (110) and does not extend further in this direction, the pin (110) and the second part (130) define a/the first height (H110), which is the length the pin (110) protrudes from the interfacial point (112) in the longitudinal direction (Sz) to the extremal point (114) of the pin (110) in the longitudinal direction (Sz) of the stud.

208. The stud (100) of any of the examples 201 to 207, wherein a mass of the stud (100) is 0.4 g to 3 g, preferably 0.5 g to 1.5 g, most preferably 0.65 g to 1.1 g.

209. The stud (100) of any of the examples 201 to 208, wherein a mass of the pin (110) is 0.1 g to 0.8 g, preferably 0.15 g to 0.35 g.

210. The stud (100) of any of the examples 201 to 209, wherein a height (H100) of the stud, as measured in the longitudinal direction (Sz) of the stud (100) is greater than 9.5 mm, preferably 10.0 to 11.0 mm.

211. The stud (100) of any of the examples 201 to 210, wherein a greatest one-dimensional measure (dx140) of the first cross-section is 6.0 mm to 10.5 mm, preferably 7.0 mm to 10.0 mm, most preferably 7.5 mm to 8.5 mm.

212. The stud (100) of any of the examples 201 to 211, wherein a length (dn140) of a shortest straight line that connects an edge of the first cross-section, an opposite other edge of the first cross-section, and a central point (O) of the first cross-section is 4.5 mm to 9.5 mm, preferably 4.5 mm to 8.5 mm, and most preferably 5.0 to 7.5 mm.

213. The stud (100) of any of the examples 201 to 212, wherein the second cross-section has at least one and at most three axes of symmetry (S).

214. The stud (100) of any of the examples 201 to 213, wherein a part of the pin (110) penetrates into the second part (130, 134) such that a length (L110) of the pin (110) is at least 150% of a/the first height (H110) of the pin, preferably a ratio of the length (L110) of the pin (110) to the first height (H110) is at least 2, more preferably at least 3.

215. The stud (100) of any of the examples 201 to 214, wherein a Vickers hardness of the pin (110) is greater than a Vickers hardness of the second part (130).

216. The stud (100) of any of the examples 98 to 110, wherein the first area (A140) is 20 mm² to 80 mm², preferably 30 mm² to 70 mm².

The invention claimed is:

1. A tyre comprising:

a tread comprising tread blocks such that grooves are arranged between the tread blocks, and studs installed into at least some of the tread blocks, wherein:

a central region of the tread is arranged between a first shoulder region of the tread and a second shoulder region of the tread, the central region comprising a circumferential central line of the tread, the tread blocks define:

a land portion of the tread, the land portion comprising parts of the tread blocks and the studs arranged to contact a ground surface when the tyre is in use, the land portion having a total land area, and an envelope surface comprising the land portion of the tread and the regions defined by the openings of the grooves, the envelope surface having a total envelope area, the land portion of the tread comprises:

a central land area being an area of a part of the land portion of the tread that belongs to the central region, a first shoulder land area being an area of a part of the land portion of the tread that belongs to the first shoulder region, and a second shoulder land area being an area of a part of the land portion of the tread that belongs to the second shoulder region, and the envelope surface comprises:

a central envelope area being an area of a part of the envelope surface that belongs to the central region, a first shoulder envelope area being an area of a part of the envelope surface that belongs to the first shoulder region, and a second shoulder envelope area being an area of a part of the envelope surface that belongs to the second shoulder region, wherein:

a central land ratio of the tyre, the central land ratio being defined as a ratio of the central land area to the central envelope area, is 1 to 30 percentage points greater than either or both of:

a first shoulder land ratio of the tyre, the first shoulder land ratio being defined as a ratio of the first shoulder land area to the first shoulder envelope area, and a second shoulder land ratio of the tyre, the second shoulder land ratio being defined as a ratio of the second shoulder land area to the second shoulder envelope area, at least some of the tread blocks of the central region are provided with sipes, such that the tyre has a first density of sipes, the first density of sipes being defined as a total length of the sipes arranged in the central region divided by the area of the central region, at least some of the tread blocks of the first shoulder region are provided with sipes, such that the tyre has a second density of sipes, the second density of sipes being defined as a total length of the sipes arranged in the first shoulder region divided by the area of the first shoulder region, at least some of the tread blocks of the second shoulder region are provided with sipes, such that the tyre has a third density of sipes, the third density of sipes being defined as a total length of the sipes arranged in the second shoulder region divided by the area of the second shoulder region, and the first density of sipes is at least 15% greater than either or both of:

the second density of sipes and the third density of sipes, at least a part of one of the studs is arranged in a stud hole provided in one of the tread blocks, and no part of any of the sipes-is arranged closer than 6 mm to a center of the stud hole;

wherein the tyre further comprises at least one ply, at least one metal belt, a cap layer forming at least part of a running surface of the tyre, an underlayer comprising a first rubber compound, and an intermediate layer comprising a second rubber compound, the intermediate layer being arranged, at least partially, between the underlayer and the cap layer, wherein a position of a tan delta maximum of the intermediate layer and/or the second rubber compound is configured to be between −40° C. and −70° C.;

wherein a position of a tan delta maximum of the underlayer and/or the first rubber compound is configured to be between −10° C. and +15° C., determined according to ISO 4664-1:2011 in compression; and wherein each stud of the tyre comprises a base flange, a waist, and a second flange, and parts of the intermediate layer laterally surround at least some of the waists.

2. The tyre of claim 1, wherein
a width of the central region is 37% to 41% of a width of the tyre.

3. The tyre of claim 1, wherein
a width of the first shoulder region equals a width of the second shoulder region; and
the tread comprises the first shoulder region, the second shoulder region and the central region.

4. The tyre of claim 1, wherein:
a total land area of the tread is the area of the land portion of the tread,
a total envelope area of the tread is the area of the envelope surface, and
an average land ratio of the tyre, the average land ratio being defined as a ratio of the total land area to the total envelope area, is 55% to 78%.

5. The tyre of the claim 1, wherein:
the tyre comprises multiple sipes such that a part of each one of the multiple sipes is arranged closer than 12 mm to a center of the stud hole to which a stud has been arranged.

6. The tyre of the claim 1, wherein at least some of the grooves are inclined such that the at least some of the grooves define a V-shape or a half of a V-shape, the V-shape or the half of a V-shape defining a direction of rotation of the tyre when used driving forwards, the direction of rotation being reverse to the direction to which the V-shape or the half of a V-shape opens.

7. The tyre of claim 1, wherein the tread comprises rubber material having a Shore hardness in the range 48 to 59 Sh (A) as measured with durometer type A, at a temperature of 23° C.

8. The tyre of claim 1, wherein
the tyre has a width that is 150 mm to 350 mm, and/or
the tread has a first width that is 150 mm to 350 mm.

9. The tyre of claim 1, wherein at least a plurality of the studs comprise:
a body comprising a base flange and a second part, the second part comprises a second flange and a waist, the waist connecting the base flange to the second flange, the second part extending in a longitudinal direction of the stud from the base flange,
a pin that protrudes from the second flange in the longitudinal direction of the stud, wherein:
the pin comprises metal or ceramic,
the base flange has a first cross-section on a plane that has a normal in the longitudinal direction of the stud, the first cross-section having a first area,
the pin has a second cross-section on a plane that has a normal in the longitudinal direction of the stud, the second cross-section having a second area,
the waist has a third cross-section on a plane that has a normal in the longitudinal direction of the stud, the third cross-section having a third area,
the second flange has a fourth cross-section on a plane that has a normal in the longitudinal direction of the stud, the fourth cross-section having a fourth area,
the fourth area is greater than the third area,
the fourth area is greater than the second area,
the first area is greater than the third area,
the first area is greater than the second area, and
the first area is 20 mm$^2$ to 80 mm$^2$.

10. The tyre of the claim 9, wherein in the plurality of the studs the pin protrudes a first height from the second part in the longitudinal direction; and a ratio of the first area to the second area is 6.5 to 21, and/or a ratio of the first area to a first height is 20 to 50 mm$^2$/mm.

11. The tyre of claim 1, wherein:

the central region comprises studs, and the first shoulder region and the second shoulder region comprise studs.

12. The tyre of claim 11, wherein:

the first shoulder region and the second shoulder region comprise studs of a first stud type and the central region comprises studs of a second stud type.

\* \* \* \* \*